United States Patent
Park et al.

(10) Patent No.: US 12,032,417 B2
(45) Date of Patent: Jul. 9, 2024

(54) ELECTRONIC DEVICE INCLUDING HINGE MODULE

(71) Applicant: Samsung Electronics Co., Ltd., Suwon-si (KR)

(72) Inventors: Daehyeong Park, Suwon-si (KR); Jaehee Kim, Suwon-si (KR); Uyhyeon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 17/832,183

(22) Filed: Jun. 3, 2022

(65) Prior Publication Data

US 2023/0025404 A1 Jan. 26, 2023

Related U.S. Application Data

(63) Continuation of application No. PCT/KR2022/004684, filed on Apr. 1, 2022.

(30) Foreign Application Priority Data

Jul. 20, 2021 (KR) .................. 10-2021-0094742

(51) Int. Cl.
  *G06F 1/16* (2006.01)
  *E05D 3/12* (2006.01)
  (Continued)

(52) U.S. Cl.
  CPC ........... *G06F 1/1681* (2013.01); *E05D 3/122* (2013.01); *E05D 3/18* (2013.01); *E05D 11/105* (2013.01);
  (Continued)

(58) Field of Classification Search
  CPC ..... G06F 1/1681; G06F 1/1616; E05D 3/122; E05D 3/18
  See application file for complete search history.

(56) References Cited

U.S. PATENT DOCUMENTS 9,759,242 B2 * 9/2017 Hsu ................. F16M 11/10
10,001,815 B1 * 6/2018 Yao ................... H05K 5/0234
(Continued)

FOREIGN PATENT DOCUMENTS

CN 113141427 A 7/2021
CN 213711587 U 7/2021
(Continued)

OTHER PUBLICATIONS

International Search Report and Written Opinion dated Jul. 6, 2022, issued in International Patent Application No. PCT/KR2022/004684.

*Primary Examiner* — Jeffrey O'Brien
(74) *Attorney, Agent, or Firm* — Jefferson IP Law, LLP

(57) ABSTRACT

An electronic device is provided. The electronic device includes a housing including first and second housings, a display including a first display region connected to the first housing and a second display region connected to the second housing, and a hinge module connected to the first housing and the second housing. The hinge module may include a rotation bracket including a first accommodation space providing a first rotation axis and a second accommodation space providing a second rotation axis, a rotation member including a first rotation member connected to the first display region and a second rotation member connected to the second display region, and a rail member including a first rail member connected to the first rotation member and configured to rotate in the first accommodation space, and a second rail member connected to the second rotation member and configured to rotate in the second accommodation space.

20 Claims, 13 Drawing Sheets

(51) Int. Cl.
 *E05D 3/18* (2006.01)
 *E05D 11/10* (2006.01)
(52) U.S. Cl.
 CPC ...... *G06F 1/1616* (2013.01); *E05Y 2900/606* (2013.01)

(56) References Cited

U.S. PATENT DOCUMENTS

| | | | |
|---|---|---|---|
| 10,036,188 B1* | 7/2018 | Yao | G06F 1/1681 |
| 10,168,746 B2* | 1/2019 | Senatori | G06F 1/1616 |
| 10,238,002 B2* | 3/2019 | Lin | G06F 1/1626 |
| 10,296,056 B2* | 5/2019 | Senatori | G06F 1/1616 |
| 10,317,951 B2* | 6/2019 | Senatori | G06F 1/1607 |
| 10,352,354 B1 | 7/2019 | Hsu et al. | |
| 10,480,227 B1* | 11/2019 | Chen | E05D 3/122 |
| 10,664,021 B1* | 5/2020 | Hsu | G06F 1/1626 |
| 11,009,061 B2* | 5/2021 | Chang | E05D 11/06 |
| 11,016,541 B2* | 5/2021 | Lin | E05D 3/122 |
| 11,320,871 B2* | 5/2022 | Lin | E05D 11/1014 |
| 11,353,931 B2* | 6/2022 | Hsu | G06F 1/1681 |
| 11,408,214 B1* | 8/2022 | Hsu | E05D 3/18 |
| 11,416,039 B2* | 8/2022 | Hsu | H04M 1/022 |
| 11,459,809 B1* | 10/2022 | Hsu | E05D 3/122 |
| 11,516,931 B2* | 11/2022 | Kim | G06F 1/1652 |
| 11,589,471 B2* | 2/2023 | Zhang | G06F 1/1616 |
| 11,622,457 B2* | 4/2023 | Hsu | G06F 1/1616 361/809 |
| 11,624,221 B1* | 4/2023 | Hsu | G06F 1/1681 16/354 |
| 11,644,873 B2* | 5/2023 | Hsu | G06F 1/1681 361/679.27 |
| 11,703,916 B2* | 7/2023 | Tian | G06F 1/1616 361/679.27 |
| 11,726,530 B2* | 8/2023 | Kang | G06F 1/1616 361/679.27 |
| 11,733,739 B2* | 8/2023 | Park | G06F 1/1681 361/679.27 |
| 11,841,046 B2* | 12/2023 | Lin | G06F 1/1652 |
| 11,856,119 B2* | 12/2023 | Shang | G06F 1/1652 |
| 2014/0130303 A1 | 5/2014 | Liao et al. | |
| 2019/0036068 A1 | 1/2019 | Kim et al. | |
| 2019/0243424 A1 | 8/2019 | Lee et al. | |
| 2019/0383073 A1 | 12/2019 | Zhu et al. | |
| 2019/0394894 A1 | 12/2019 | Kim | |
| 2020/0267859 A1 | 8/2020 | Kim et al. | |
| 2020/0329574 A1 | 10/2020 | Lee | |
| 2020/0348732 A1 | 11/2020 | Kang et al. | |
| 2020/0383215 A1 | 12/2020 | Kim et al. | |
| 2021/0165466 A1 | 6/2021 | Kang et al. | |
| 2021/0216103 A1* | 7/2021 | Chen | G06F 1/1652 |
| 2022/0091635 A1* | 3/2022 | Ou | G06F 1/1616 |
| 2022/0206544 A1* | 6/2022 | Park | G09F 9/30 |
| 2022/0217228 A1* | 7/2022 | Hu | G06F 1/1681 |
| 2022/0247843 A1* | 8/2022 | Hu | H04M 1/0283 |
| 2022/0400565 A1* | 12/2022 | Shin | G06F 1/1616 |
| 2023/0049811 A1* | 2/2023 | Krahn | G06F 1/1616 |
| 2023/0081207 A1 | 3/2023 | Kim | |
| 2023/0297133 A1* | 9/2023 | Lee | G06F 1/1683 361/679.02 |
| 2023/0308531 A1* | 9/2023 | Kim | G06F 1/1681 |
| 2023/0409077 A1* | 12/2023 | Kim | G06F 1/1652 |
| 2023/0409090 A1* | 12/2023 | Hong | G09F 9/30 |
| 2023/0421673 A1* | 12/2023 | Huang | G06F 1/1652 |
| 2024/0011522 A1* | 1/2024 | Jiang | H05K 5/0226 |
| 2024/0015909 A1* | 1/2024 | Peng | F16C 11/12 |

FOREIGN PATENT DOCUMENTS

| | | |
|---|---|---|
| JP | 2020-502679 A | 1/2020 |
| KR | 10-2011-0037358 A | 4/2011 |
| KR | 10-1834793 B1 | 3/2018 |
| KR | 10-2020-0101791 A | 8/2020 |
| KR | 10-2021-0068880 A | 6/2021 |
| KR | 10-2488408 B1 | 1/2023 |
| WO | 2021/051124 A1 | 3/2021 |

* cited by examiner

ELECTRONIC DEVICE INCLUDING HINGE MODULE

CROSS-REFERENCE TO RELATED APPLICATION(S)

This application is a continuation application, claiming priority under § 365(c), of an International application No. PCT/KR2022/004684, filed on Apr. 1, 2022, which is based on and claims the benefit of a Korean patent application number 10-2021-0094742, filed on Jul. 20, 2021, in the Korean Intellectual Property Office, the disclosure of which is incorporated by reference herein in its entirety.

TECHNICAL FIELD

The disclosure relates to an electronic device including a hinge module.

BACKGROUND ART

Due to the development of information and communication technology and semiconductor technology, various functions are being integrated into one portable electronic device. For example, the electronic device may implement entertainment functions such as games, multimedia functions such as music/video playback, communication and security functions for mobile banking, schedule management, and an electronic wallet function as well as communication functions. Such electronic devices are being miniaturized so that users may conveniently carry them.

As mobile communication services extend to the multimedia service area, it is necessary to increase the size of the display of an electronic device, so that a user may fully use multimedia services as well as voice calls or short messages. However, there is a trade-off between the increase of the size of the display of the electronic device and the miniaturization of the electronic device.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device (e.g., a portable terminal) includes a flat display or a display having a flat surface and a curved surface. An electronic device including a display may have limitations in implementing a screen larger than the size of the electronic device due to a fixed display structure. Accordingly, studies are being made on foldable electronic devices.

It may be difficult to ensure mechanical stability while allowing structures of an electronic device to move (e.g., rotate) relative to each other. For example, it may be difficult to secure a stable operating mechanism for a foldable electronic device, while ensuring portability of the electronic device through miniaturization.

Further, the electronic device may receive various inputs from a user through a specific input device (e.g., a stylus pen) connected to the electronic device through wireless communication. The electronic device may identify a position on the electronic device, designated by the input device and execute a function corresponding to the identified position. For example, the electronic device may detect a magnetic field generated from the input device by electromagnetic resonance (EMR). However, a material (e.g., ferromagnetic metal) contained in a hinge module may interfere with a magnetic field generated between the input device and a touch circuit of the display.

Aspects of the disclosure are to address at least the above-mentioned problems and/or disadvantages and to provide at least the advantages described below. Accordingly, an aspect of the disclosure is to provide an electronic device including a hinge module for reducing interference with a magnetic field transmitted to a touch circuit of a display.

Another aspect of the disclosure is to provide an electronic device including a hinge module for allowing a stable folding or unfolding operation of housings.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a first housing and a second housing, a display including a first display region connected to the first housing and a second display region connected to the second housing, and a hinge module connected to the first housing and the second housing. The hinge module may include a rotation bracket including a first accommodation space providing a first rotation axis and a second accommodation space providing a second rotation axis, a rotation member including a first rotation member connected to the first display region and a second rotation member connected to the second display region, and a rail member including a first rail member connected to the first rotation member and configured to rotate in the first accommodation space, and a second rail member connected to the second rotation member and configured to rotate in the second accommodation space. A first permeability of the rotation member may be lower than a second permeability of the rail member.

In accordance with another aspect of the disclosure, an electronic device is provided. The electronic device includes a housing including a first housing and a second housing, a display including a first display region connected to the first housing and a second display region connected to the second housing, and a hinge module connected to the first housing and the second housing. The hinge module may include a rotation bracket including a first accommodation space providing a first rotation axis and a second accommodation space providing a second rotation axis, a rotation member including a first rotation member connected to the first display region and a second rotation member connected to the second display region, and a rail member including a first rail member connected to the first rotation member and configured to rotate around the first rotation axis in the first accommodation space, and a second rail member connected to the second rotation member and configured to rotate around the second rotation axis in the second accommodation space. A permeability of the rotation member may be 1 to 1.1 henries per meter (H/m).

In accordance with another aspect of the disclosure, a hinge module is provided. The hinge module includes a rotation bracket including a first accommodation space providing a first rotation axis and a second accommodation space providing a second rotation axis, a first rail member configured to rotate around the first rotation axis in the first accommodation space, a second rail member configured to rotate around the second rotation axis in the second accommodation space, a first rotation member connected to the first rail member, and a second rotation member connected to the second rail member. A first permeability of the first rotation member and/or the second rotation member may be lower than a second permeability of the first rail member and/or the second rail member.

Advantageous Effects

An electronic device according to various embodiments of the disclosure may include a hinge module which includes a paramagnetic rotation member and a rail member having a yield strength greater than the yield strength of the rotation member. Accordingly, the durability of the hinge module may be maintained, and interference with a magnetic field transmitted to a touch circuit of a display may be reduced.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
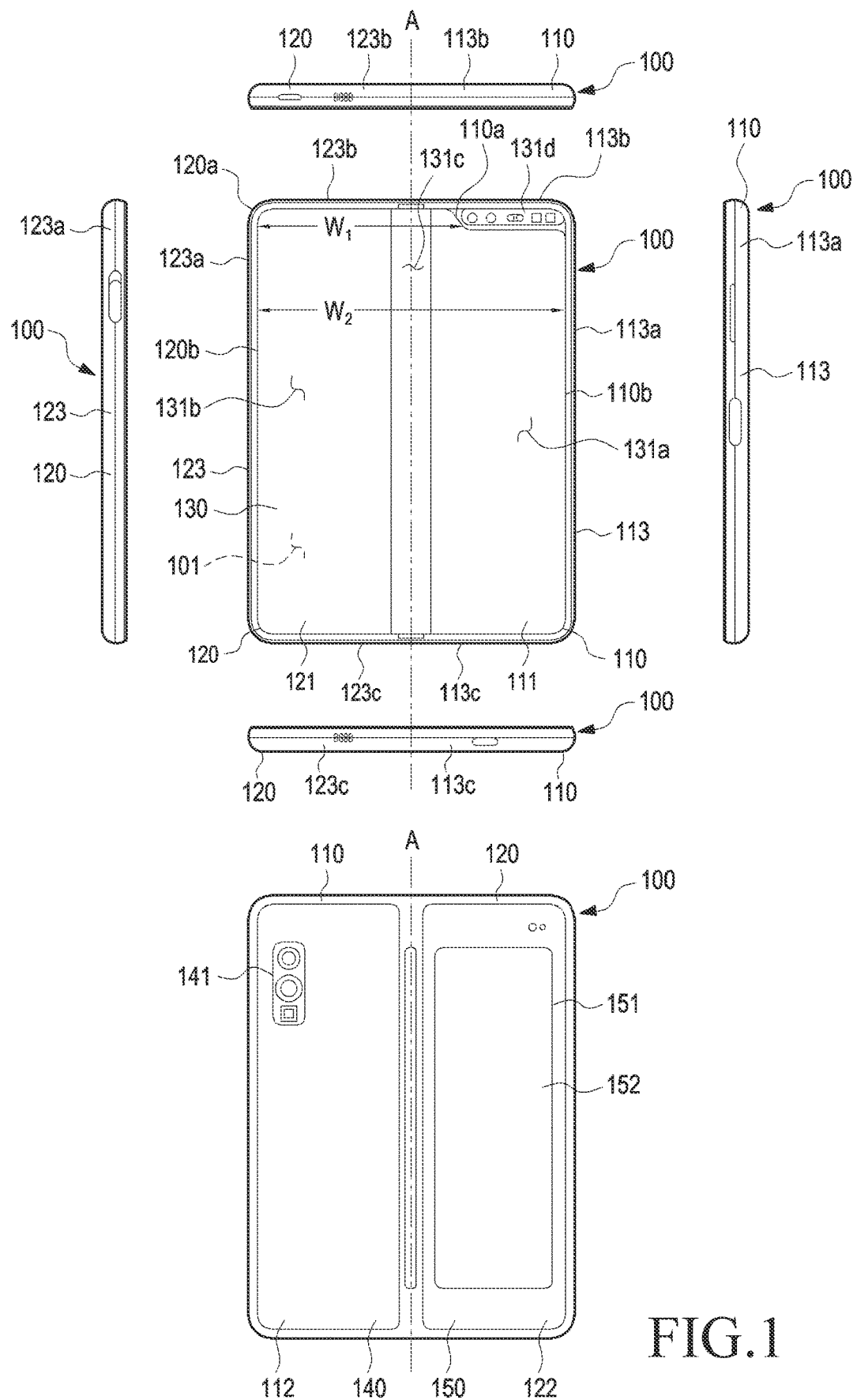
FIG. 1 is a diagram illustrating an electronic device in an extended state according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a diagram illustrating an electronic device in an extended state according to an embodiment of the disclosure.

Figure 2:
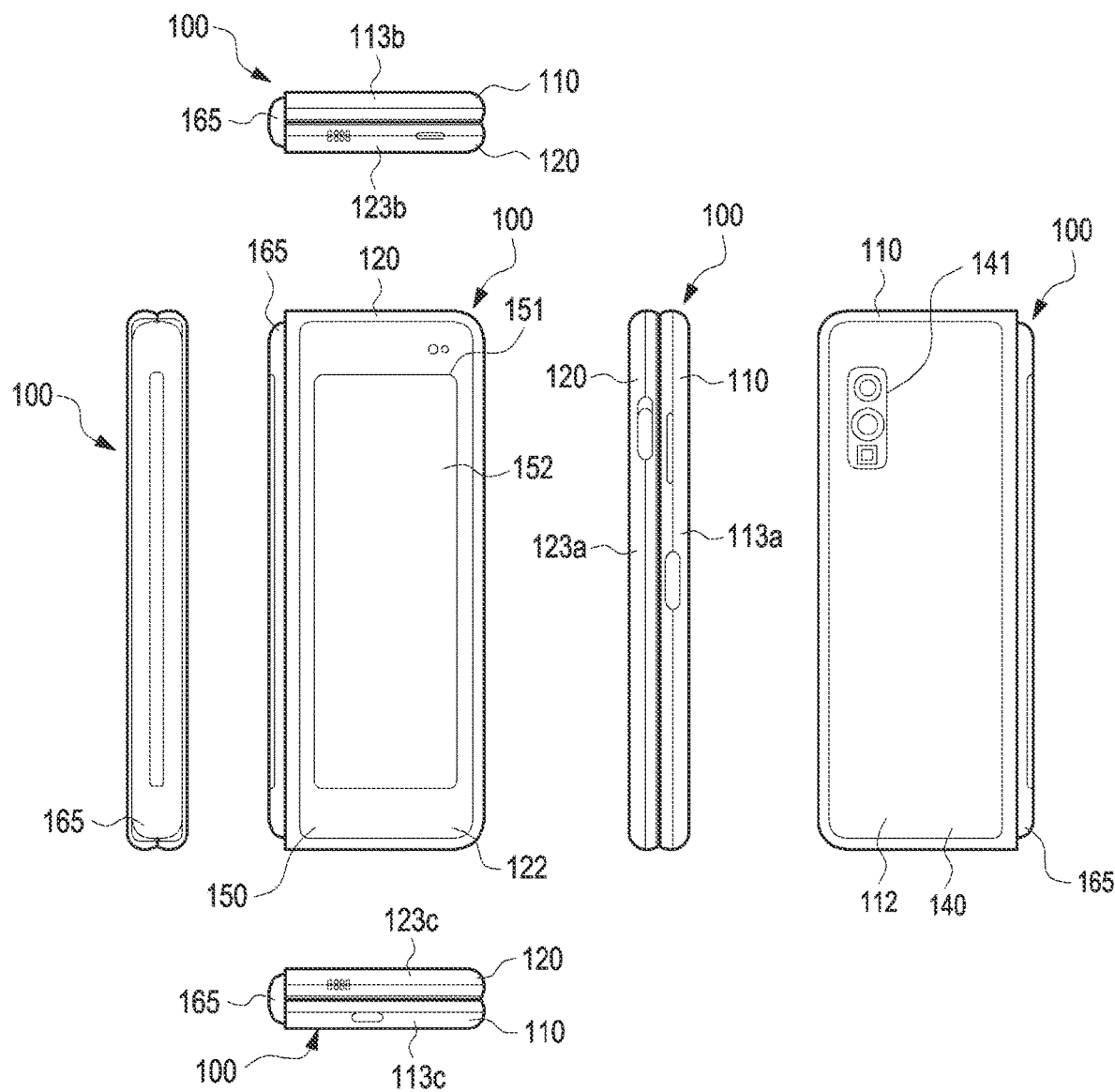
FIG. 2 is a diagram illustrating an electronic device in a folded state according to an embodiment of the disclosure.

FIG. 2 is a diagram illustrating the electronic device in a folded state according to an embodiment of the disclosure.

In the following detailed description, a configuration in which a pair of housings (or referred to as 'housings') are rotatably connected with each other by a hinge module (or referred to as a 'hinge structure') is taken as an example. However, it should be noted that this embodiment does not limit the electronic device according to various embodiments of the disclosure. For example, the electronic device according to various embodiments of the disclosure may include three or more housings, and "a pair of housings" in the embodiments disclosed below may mean "two housings rotatably connected with each other among the three or more housings."

Referring to FIG. 1, an electronic device 100 may include a pair of housings 110 and 120 that are rotatably coupled by a hinge module (e.g., a hinge module 164 of FIG. 3) to be folded with respect to each other, a hinge cover 165 that covers foldable portions of the pair of housings 110 and 120, and a display 130 (e.g., a flexible display or a foldable display) disposed in a space formed by the pair of housings 110 and 120. In an embodiment, the electronic device 100 may include a foldable housing in which the pair of housings 110 and 120 are coupled to be rotatable from a position at which the pair of housings 110 and 120 face each other to a position at which the pair of housings 110 and 120 are unfolded in parallel with each other. Herein, a surface on which the display 130 is disposed may be defined as a front surface of the electronic device 100, and a surface opposite to the front surface may be defined as a rear surface of the electronic device 100. A surface surrounding a space between the front and rear surfaces may be defined as a side surface of the electronic device 100.

In an embodiment, the pair of housings 110 and 120 may include a first housing 110 including a sensor region 131d, a second housing 120, a first rear cover 140, and a second rear cover 150. The pair of housings 110 and 120 of the electronic device 100 may be configured in a different shape or by a combination and/or engagement of other components, not limited to the shape and engagement illustrated in FIGS. 1 and 2. For example, in another embodiment, the first housing 110 and the first rear cover 140 may be integrally formed, and the second housing 120 and the second rear cover 150 may be integrally formed. In another embodiment, the first housing 110 may include the first rear cover 140, and the second housing 120 may include the second rear cover 150.

According to an embodiment, the first housing 110 and the second housing 120 may be disposed, for example, on both sides of a folding axis A, and may be symmetrical in shape as a whole with respect to the folding axis A. In some embodiments, the first housing 110 and the second housing 120 may rotate around different folding axes with respect to the hinge module 164 or the hinge cover 165. For example, each of the first housing 110 and the second housing 120 may be rotatably coupled with the hinge module 164 or the hinge cover 165. As the first housing 110 and the second housing 120 rotate around the folding axis A or different folding axes, the first housing 110 and the second housing 120 may rotate between a folded position and a position at which they are inclined with respect to each other or a position at which they are unfolded in parallel with each other.

Herein, the expression "located side by side" or "extended side by side" may mean a state in which two structures (e.g., the housings 110 and 120) are at least partially located next to each other or a state in which parts of the two structures, located next to each other are arranged in parallel. In some embodiments, "arranged side by side" may mean that the two structures are disposed next to each other, facing parallel directions or the same direction. Although expressions such as "side by side" and "parallel" may be used in the following detailed description, they will be easily understood according to the shapes or arrangement relationship of the structures with reference to the accompanying drawings.

According to an embodiment, the angle or distance between the first housing 110 and the second housing 120 may vary depending on whether the electronic device 100 is in an extended state (unfolded state or flat state) (or opened state), a folded state (or closed state), or an intermediate state. In describing various embodiments of the disclosure, when it is said that the electronic device 100 is placed in the "extended state," this may mean a "fully extended state" in which the first housing 110 and the second housing 120 of the electronic device 100 form an angle of 180 degrees. When it is said that the electronic device 100 is placed in the "closed state," this may mean that the first housing 110 and the second housing 120 of the electronic device form an angle of 0 degrees or an angle less than 10 degrees. When the electronic device 100 is placed in the "intermediate state," this may mean that the first housing 110 and the second housing 120 form an angle between the angle formed in the "extended state" and the angle formed in the "closed state."

According to an embodiment, while the first housing 110 further includes the sensor region 131d having various sensors arranged therein, unlike the second housing 120, the first housing 110 and the second housing 120 may be symmetrical with each other in shape in the remaining region except for the sensor region 131d. In another embodiment, the sensor region 131d may be additionally disposed in or replaced by at least a partial region of the second housing 120. In another embodiment, the sensor region 131d may be omitted in the first housing 110.

In an embodiment, in the extended state of the electronic device 100, the first housing 110 may be connected to the hinge module (e.g., the hinge module 164 of FIG. 3), and include a first surface 111 facing the front surface of the electronic device 100, a second surface 112 facing in the opposite direction to the first surface 111, and a first side member 113 at least partially surrounding a space between the first surface 111 and the second surface 112. In an embodiment, the first side member 113 may include a first side surface 113a disposed in parallel with the folding axis A, a second side surface 113b extending from one end of the first side surface 113a in a direction perpendicular to the folding axis A, and a third side surface 113c extending from the other end of the first side surface 113a in the direction perpendicular to the folding axis A. In the description of various embodiments of the disclosure, an expression such as "parallel" or "perpendicular" is used to describe the arrangement relationship of the above-described side surfaces. However, the expression encompasses the meaning of "partially parallel" or "partially perpendicular" according to embodiments. In some embodiments, the expression "parallel" or "perpendicular" may mean an inclined arrangement relationship within an angle range of 10 degrees.

In an embodiment, the second housing 120 may be connected to the hinge module (e.g., the hinge module 164 of FIG. 3) and include a third surface 121 facing the front surface of the electronic device 100, a fourth surface 122 facing in the opposite direction to the third surface 121, and a second side member 123 at least partially surrounding a space between the third surface 121 and the fourth surface 122, in the extended state of the electronic device 100. In an embodiment, the second side member 123 may include a fourth side surface 123a disposed in parallel to the folding axis A, a fifth side surface 123b extending from one end of the fourth side surface 123a in the direction perpendicular to the folding axis A, and a sixth side surface 123c extending from the other end of the fourth side surface 123a in the direction perpendicular to the folding axis A. In an embodiment, the third surface 121 may be disposed to face the first surface 111 in the folded state. In some embodiments, although there is some difference in specific shapes, the second side member 123 may be formed into substantially the same shape as the first side member 113 or may be formed of substantially the same material as the first side member 113.

In an embodiment, the electronic device 100 may include a recess 101 formed to accommodate the display 130 therein through structural shape coupling between the first housing 110 and the second housing 120. The recess 101 may have substantially the same size as the display 130. In an embodiment, the recess 101 may have two or more different widths in the direction perpendicular to the folding axis A due to the sensor region 131d. For example, the recess 101 may have a first width W1 between a first part 120a of the second housing 120 parallel to the folding axis A and a first part 110a of the first housing 110, formed at an edge of the sensor region 131d, and a second width W2 between a second part 110b of the second housing 120 and a second part 110b of the first housing 110, which does not correspond to the sensor region 131d and is parallel to the folding axis A. In this case, the second width W2 may be greater than the first width W1. For example, the recess 101 may be formed to have the first width W1 covering the first part 110a of the first housing 110 and the first part 120a of the second housing 120 which are asymmetrical to each other, and the second width W2 covering the second part 110b of the first housing 110 and the second part 120b of the second housing 120 which are symmetrical to each other. In an embodiment, the first part 110a and the second part 110b of the first housing 110 may be formed to have different distances from the folding axis A. The widths of the recess 101 are not limited to the illustrated example. In various embodiments, the recess 101 may have two or more different widths according to the shape of the sensor region 131d or the asymmetrical parts of the first housing 110 and the second housing 120.

In an embodiment, the first housing 110 and the second housing 120 may be at least partially formed of a metallic material or a non-metallic material, which has a rigidity selected to support the display 130. In another embodiment, at least parts of the first housing 110 and the second housing 120 may contain an electrically conductive material. When the first housing 110 and the second housing 120 contain the electrically conductive material, the electronic device 100 may transmit and receive radio waves by means of the parts of the electrically conductive material in the first housing 110 and the second housing 120. For example, a processor or a communication module of the electronic device 100 may perform wireless communication by using the parts of the first housing 110 and the second housing 120.

In an embodiment, the sensor region 131d may be formed to have a predetermined area adjacent to one corner of the first housing 110. However, the arrangement, shape, or size of the sensor region 131d is not limited to the illustrated example. For example, in another embodiment, the sensor region 131d may be provided in any area adjacent to another corner of the first housing 110 or in any area between top and bottom corners of the first housing 110. In another embodiment, the sensor region 131d may be disposed in at least a partial area of the second housing 120. In another embodiment, the sensor region 131d may be disposed to extend to the first housing 110 and the second housing 120. In an embodiment, the electronic device 100 may include components exposed from the front surface of the electronic device 100 through the sensor region 131d or at least one opening formed in the sensor region 131d, and various functions may be executed by these components. The components arranged in the sensor region 131d may include, for example, at least one of a front camera device, a proximity sensor, an illuminance sensor, an iris recognition sensor, an ultrasonic sensor, or an indicator. However, the components are not limited to this embodiment. The sensor region 131d may be omitted according to some embodiments. According to these embodiments, the components arranged in the sensor region 131d may be distributed over at least a partial area of the first housing 110 and/or the second housing 120.

In an embodiment, the first rear cover 140 may be disposed on the second surface 112 of the first housing 110 and have a substantially rectangular periphery. In an embodiment, the periphery of the first rear cover 140 may be at least partially surrounded by the first housing 110. Similarly, the second rear cover 150 may be disposed on the fourth surface 122 of the second housing 120, and the periphery of the second rear cover 150 may be at least partially surrounded by the second housing 120.

In the illustrated embodiment, the first rear cover 140 and the second rear cover 150 may have substantially symmetrical shapes with respect to the folding axis A. In another embodiment, the first rear cover 140 and the second rear cover 150 may be in various different shapes. In another embodiment, the first rear cover 140 may be integrally formed with the first housing 110, and the second rear cover 150 may be integrally formed with the second housing 120.

In an embodiment, a structure in which the first rear cover 140, the second rear cover 150, the first housing 110, and the second housing 120 are coupled with each other may provide a space in which various components (e.g., a printed circuit board (PCB), an antenna module, a sensor module, or a battery) may be arranged. In an embodiment, one or more components may be disposed or visually exposed on the rear surface of the electronic device 100. For example, one or more components or sensors may be visually exposed through a first rear region 141 of the first rear cover 140. In various embodiments, the sensors may include a proximity sensor, a rear camera device, and/or a flash. In another embodiment, at least a part of a sub-display 152 may be visually exposed through a second rear region 151 of the second rear cover 150.

The display 130 may be disposed in a space defined by the pair of housings 110 and 120. For example, the display 130 may be mounted in the recess (e.g., the recess 101 of FIG. 1) formed by the pair of housings 110 and 120, and occupy substantially most of the front surface of the electronic device 100. For example, the front surface of the electronic device 100 may include the display 130, and partial areas (e.g., peripheral areas) of the first and second housings 110 and 120 adjacent to the display 130. In an embodiment, the rear surface of the electronic device 100 may include the first rear cover 140, a partial area (e.g., a peripheral area) of the first housing 110 adjacent to the first rear cover 140, the second rear cover 150, and a partial area (e.g., a peripheral area) of the second housing 120 adjacent to the second rear cover 150.

In an embodiment, the display 130 may refer to a display which is at least partially deformable into a flat surface or a curved surface. In an embodiment, the display 130 may include a folding region 131*c*, a first display region 131*a* disposed on one side of the folding region 131*c* (e.g., a right region of the folding region 131*c*), and a second display region 131*b* disposed on the other side of the folding region 131*c* (e.g., a left region of the folding region 131*c*). For example, the first display region 131*a* may be disposed on the first surface 111 of the first housing 110, and the second display region 131*b* may be disposed on the third surface 121 of the second housing 120. For example, the display 130 may extend from the first surface 111 to the third surface 121 through the hinge module 164 of FIG. 3, and at least a region corresponding to the hinge module 164 (e.g., the folding region 131*c*) may be a flexible region deformable from the shape of a flat plate to the shape of a curved surface.

In an embodiment, the region division of the display 130 is exemplary, and the display 130 may be divided into a plurality of regions (e.g., two regions or four or more regions) according to its structure or function. For example, in the embodiment illustrated in FIG. 1, the folding region 131*c* may extend in a vertical direction (e.g., a Y axis of FIG. 3) parallel to the folding axis A, and the display 130 may be divided into regions with respect to the folding region 131*c* or the folding axis A, whereas in another embodiment, the display 130 may be divided into regions with respect to a different folding region (e.g., a folding region parallel to a horizontal axis (e.g., an X axis of FIG. 3) or a different folding axis (e.g., a folding axis parallel to the X axis of FIG. 3)). The above-described region division of the display 130 is only a physical division by the pair of housings 110 and 120 and the hinge module (e.g., the hinge module 164 of FIG. 3). The display 130 may display one full screen through substantially the pair of housings 110 and 120 and the hinge module (e.g., the hinge module 164 of FIG. 3).

According to an embodiment, the first display region 131*a* and the second display region 131*b* may have symmetrical shapes as a whole with respect to the folding region 131*c*. However, unlike the second display region 131*b*, the first display region 131*a* may include a notch region (e.g., a notch region 133 of FIG. 3) providing the sensor region 131*d*, and may have a shape symmetrical with that of the second display region 131*b* in the remaining region. For example, the first display region 131*a* and the second display region 131*b* may include parts symmetrical to each other and parts asymmetrical to each other, in terms of shape.

Figure 3:
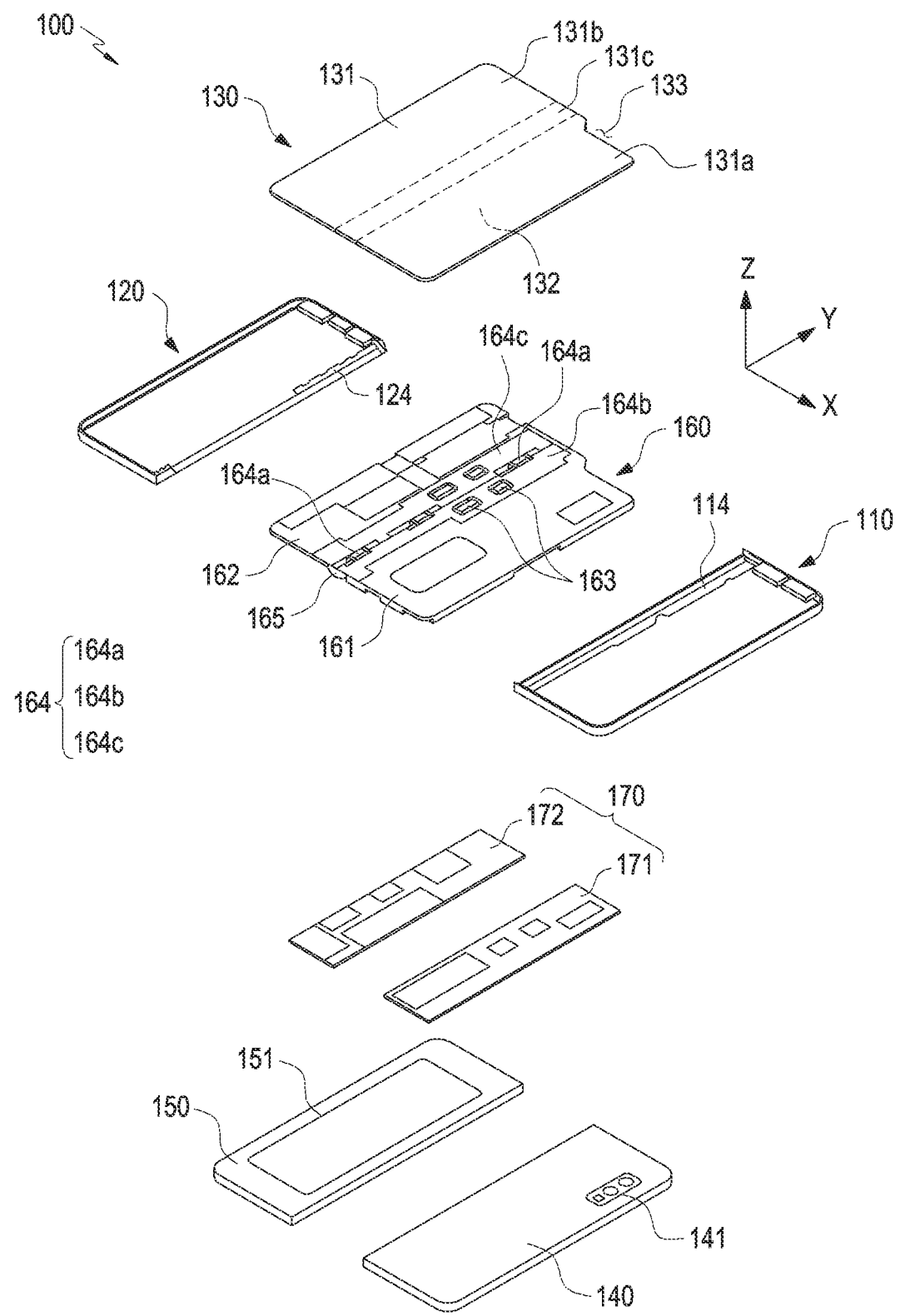
FIG. 3 is an exploded perspective view illustrating an electronic device according to an embodiment of the disclosure.

Referring to FIG. 3, the hinge cover 165 may be disposed between the first housing 110 and the second housing 120 and configured to cover an internal component (e.g., the hinge module 164 of FIG. 3). In an embodiment, the hinge cover 165 may be covered or exposed outward by parts of the first housing 110 and the second housing 120 according to an operating state (the extended state or the folded state) of the electronic device 100.

Now, a description will be given of the operations of the first housing 110 and the second housing 120 and each region of the display 130 according to the operating states (e.g., the extended state and the folded state) of the electronic device 100.

In an embodiment, when the electronic device 100 is in the extended state (e.g., the state of FIG. 1), the first housing 110 and the second housing 120 are at an angle of 180 degrees, and the first display region 131*a* and the second display region 131*b* of the display 130 may be disposed to face the same direction, for example, to display screens in parallel directions. Further, the folding region 131*c* may form the same plane with the first display region 131*a* and the second display region 131*b*.

In an embodiment, when the electronic device 100 is in the folded state (e.g., the state of FIG. 2), the first housing 110 and the second housing 120 may be disposed to face each other. For example, when the electronic device 100 is in the folded state (e.g., the state of FIG. 2), the first display region 131*a* and the second display region 131*b* of the display 130 may be at a narrow angle (e.g., between 0 and 10 degrees) and face each other. When the electronic device 100 is in the folded state (e.g., the state of FIG. 2), at least a part of the folding region 131*c* may form a curved surface with a specific curvature.

In an embodiment, when the electronic device 100 is in the intermediate state, the first housing 110 and the second housing 120 may form a certain angle, for example, 90 degrees or 120 degrees. For example, in the intermediate state, the first display region 131*a* and the second display region 131*b* of the display 130 may form an angle larger than that in the folded state and smaller than that in the extended state. At least a part of the folding region 131*c* may have a curved surface with a predetermined curvature, which may be smaller than that in the folded state.

FIG. 3 is an exploded perspective view illustrating an electronic device according to an embodiment of the disclosure.

Referring to FIG. 3, in an embodiment, an electronic device 100 may include a display 130, a support member assembly 160, at least one PCB 170, a first housing 110, a second housing 120, a first rear cover 140, and a second rear cover 150. Herein, the display 130 may be referred to as a display module or a display assembly.

The display 130 may include a display panel 131 (e.g., a flexible display panel) and at least one plate 132 or layer on which the display panel 131 is mounted. In an embodiment, the plate 132 may be disposed between the display panel 131 and the support member assembly 160. The display panel 131 may be disposed on at least a part of one surface (e.g., a surface in a Z-axis direction of FIG. 3) of the plate 132. The plate 132 may be formed into a shape corresponding to the display panel 131. For example, a partial area of the plate 132 may be formed into a shape corresponding to the notch region 133 of the display panel 131.

The support member assembly 160 may include a first support member 161, a second support member 162, the hinge module 164 disposed between the first support member 161 and the second support member 162, the hinge cover 165 which covers the hinge module 164 when the hinge module 164 is viewed from the outside, and a wiring member 163 (e.g., a flexible printed circuit board (FPCB)) crossing the first and second support members 161 and 162.

In an embodiment, the support member assembly 160 may be disposed between the plate 132 and the at least one PCB 170. For example, the first support member 161 may be disposed between the first display region 131a of the display 130 and a first PCB 171. The second support member 162 may be disposed between the second display region 131b of the display 130 and a second PCB 172.

In an embodiment, at least a part of the wiring member 163 and the hinge module 164 may be disposed inside the support member assembly 160. The wiring member 163 may be disposed in a direction (e.g., an X-axis direction) crossing the first support member 161 and the second support member 162. The wiring member 163 may be disposed in the direction (e.g., the X-axis direction) perpendicular to the folding axis (e.g., the Y axis or the folding axis A of FIG. 1) of the folding region 131c.

According to various embodiments, the hinge module 164 may include a hinge module 164a, a first hinge plate 164b, and/or a second hinge plate 164c. In some embodiments, the hinge module 164a may be interpreted as including the first hinge plate 164b and the second hinge plate 164c. In an embodiment, the first hinge plate 164b may be mounted inside the first housing 110, and the second hinge plate 164c may be mounted inside the second housing 120. In some embodiments, the first hinge plate 164b may be coupled with the first support member 161, and the second hinge plate 164c may be coupled with the second support member 162. In another embodiment, the first hinge plate 164b (or the second hinge plate 164c) may be coupled with another structure (e.g., a first rotation support surface 114 or a second rotation support surface 124) inside the first housing 110 (or the second housing 120). For example, the structure in which the first hinge plate 164b (or the second hinge plate 164c) is coupled inside the first housing 110 (or the second housing 120) may vary depending on embodiments. In another embodiment, the hinge module 164a may be coupled with the first hinge plate 164b and the second hinge plate 164c to rotatably connect the second hinge plate 164c to the first hinge plate 164b. For example, the folding axis (e.g., the folding axis A of FIG. 1) may be formed by the hinge module 164a, and the first housing 110 and the second housing 120 (or the first support member 161 and the second support member 162) may rotate substantially around the folding axis A with respect to each other.

The at least one PCB 170 may include the first PCB 171 disposed at the side of the first support member 161 and the second PCB disposed at the side of the second support member 162, as described before. The first PCB 171 and the second PCB 172 may be disposed inside a space formed by the support member assembly 160, the first housing 110, the second housing 120, the first rear cover 140, and the second rear cover 150. Components for executing various functions of the electronic device 100 may be arranged on the first PCB 171 and the second PCB 172.

In an embodiment, with the display 130 coupled with the support member assembly 160, the first housing 110 and the second housing 120 may be assembled to be coupled with both sides of the support member assembly 160. The first housing 110 and the second housing 120 may be slidably coupled with both sides of the support member assembly 160, for example, the first support member 161 and the second support member 162, respectively. The first support member 161 and the second support member 162 may be accommodated substantially in the first housing 110 and the second housing 120, and according to an embodiment, the first support member 161 and the second support member 162 may be interpreted as parts of the first housing 110 and the second housing 120.

In one embodiment, the first housing 110 may include the first rotation support surface 114, and the second housing 120 may include the second rotation support surface 124 corresponding to the first rotation support surface 114. The first rotation support surface 114 and the second rotation support surface 124 may include curved surfaces corresponding to a curved surface included in the hinge cover 165.

In an embodiment, when the electronic device 100 is in the extended state (e.g., the state of FIG. 1), the first rotation support surface 114 and the second rotation support surface 124 may cover the hinge cover 165 such that the hinge cover 165 may not be exposed or may be minimally exposed from the rear surface of the electronic device 100. In an embodiment, when the electronic device 100 is in the folded state (e.g., the state of FIG. 2), the first rotation support surface 114 and the second rotation support surface 124 may rotate along the curved surface included in the hinge cover 165 to maximize exposure of the hinge cover 165 from the rear surface of the electronic device 100.

In the above detailed description, ordinal numbers such as first and second in the first housing 110, the second housing 120, the first side member 113, and the second side member 123 are used simply to distinguish components from each other, and it should be noted that the ordinal numbers do not limit the disclosure. For example, although the sensor region 131d has been described as formed in the first housing 110 by way of example, the sensor region 131d may be formed in the second housing 120 or the first and second housings 110 and 120. In another embodiment, although it has been described that the first rear region 141 is disposed on the first rear cover 140 and the sub-display 152 is disposed on the second rear cover 150 by way of example, both the first rear region 141 for arranging sensors and so on therein and the sub-display 152 for outputting a screen may be disposed on either the first rear cover 140 or the second rear cover 150.

According to an embodiment, the hinge module 164 may include a plurality of hinge modules arranged in parallel. For example, the hinge module 164 may include a first hinge module (not shown) and a second hinge module (not shown) which are symmetrical with respect to the width direction (e.g., the X-axis direction) of the electronic device 100.

Figure 4:
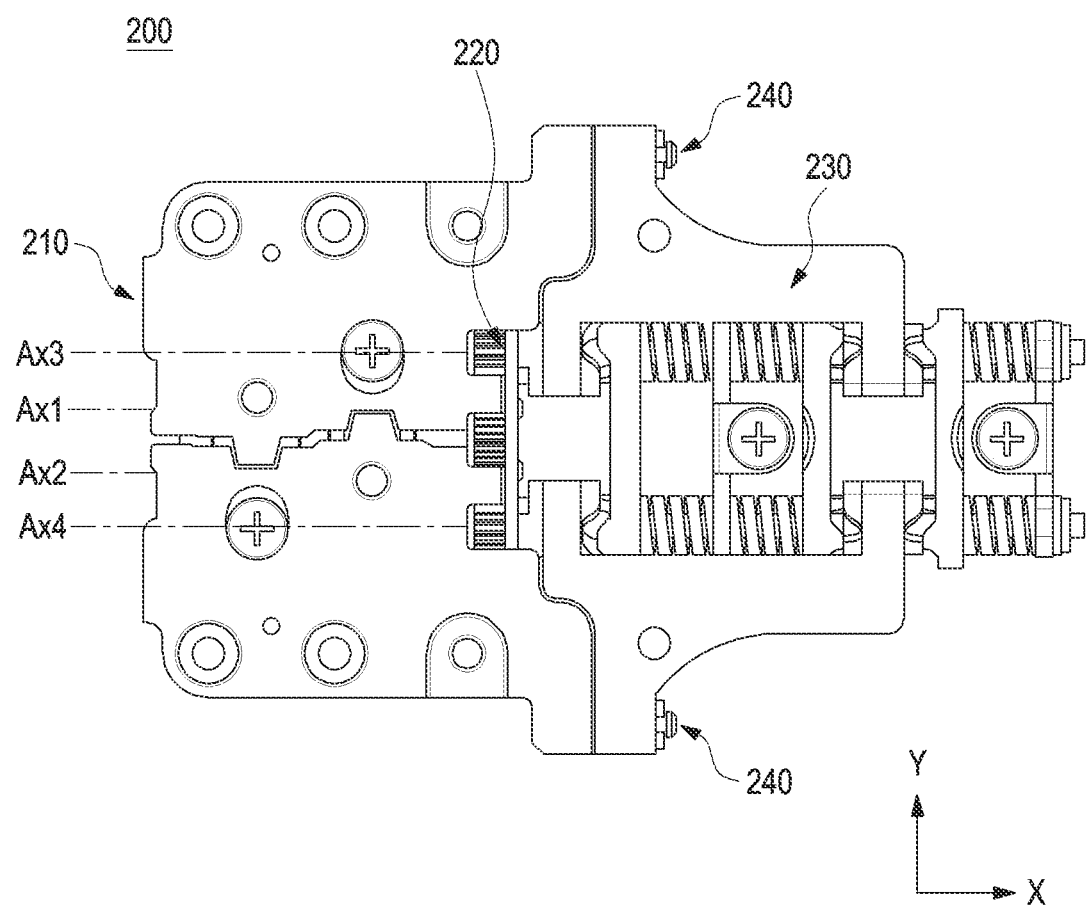
FIG. 4 is a top view illustrating a hinge module according to an embodiment of the disclosure.

FIG. 4 is a top view illustrating a hinge module according to an embodiment of the disclosure.

Figure 5:
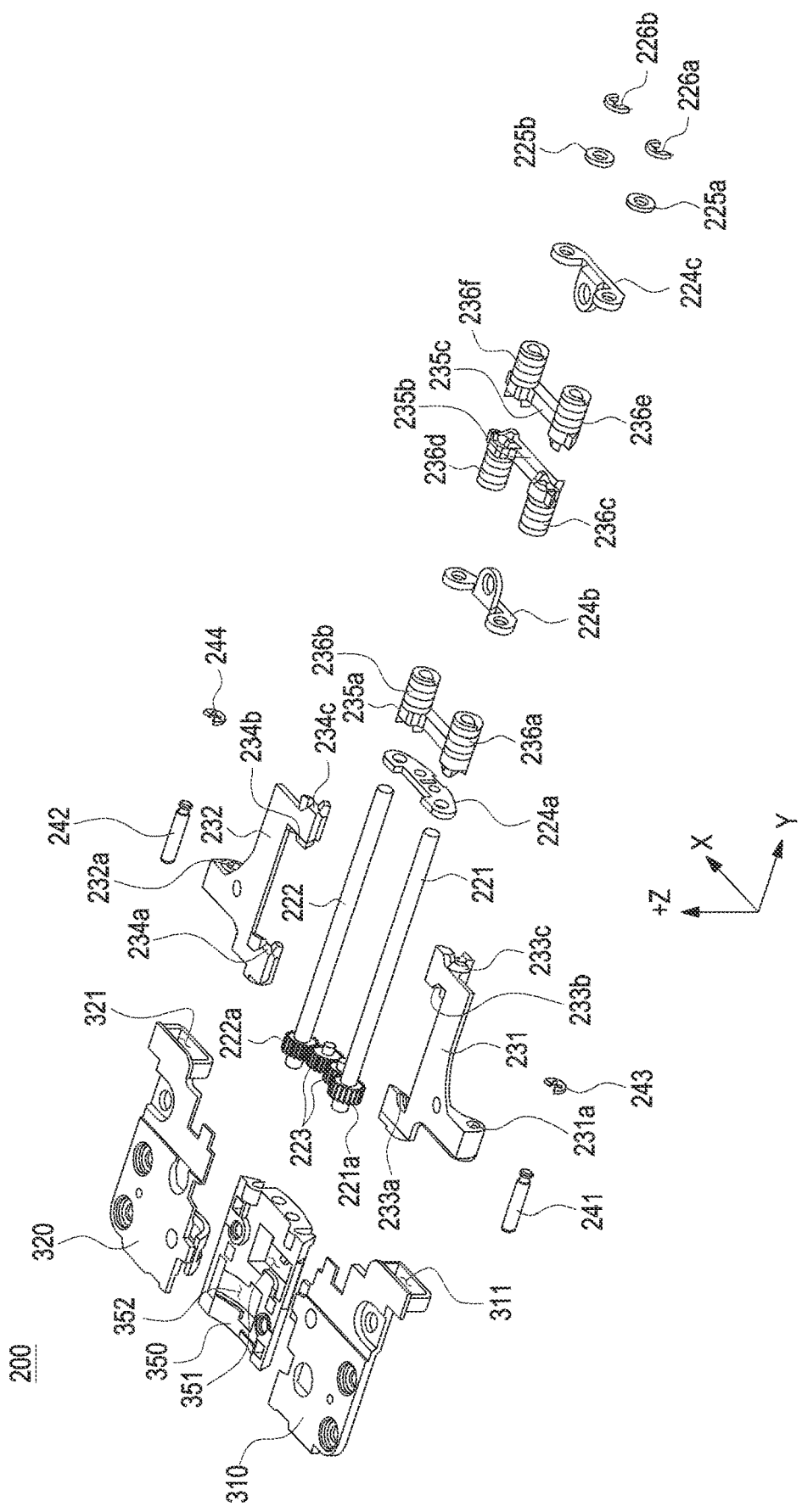
FIG. 5 is an exploded perspective view illustrating a hinge module according to an embodiment of the disclosure.

FIG. 5 is an exploded perspective view illustrating the hinge module according to an embodiment of the disclosure.

Referring to FIG. 4 and/or FIG. 5, a hinge module 200 may include a rotation structure 210, an interlocking structure 220, and/or a fixing structure. The configuration of the hinge module 200 of FIG. 4 and/or FIG. 5 may be wholly or partially identical to that of the hinge module 164 of FIG. 3.

According to various embodiments, the hinge module 200 may be connected to a first housing (e.g., the first housing 110 of FIG. 1) and a second housing (e.g., the second housing 120 of FIG. 1). The first housing 110 may rotate with respect to the second housing 120 by using the hinge module 200.

According to various embodiments, the rotation structure 210 may substantially implement or guide the rotation operation of the first housing (e.g., first housing 110 of FIG. 1) and/or the second housing (e.g., second housing 120 of FIG. 1). According to an embodiment, the rotation structure 210 may provide a first rotation axis Ax1 and a second rotation axis Ax2. For example, the first housing 110 may rotate around the first rotation axis Ax1, and the second housing 120 may rotate around the second rotation axis Ax2. According to an embodiment, a folding axis (e.g., the folding axis A of FIG. 1) may be interpreted as an imaginary axis located between the first rotation axis Ax1 and the second rotation axis Ax2.

According to various embodiments, the hinge module 200 (e.g., the rotation structure 210) may include rotation members 310 and 320 and a rotation bracket 350. According to an embodiment, the rotation members 310 and 320 may include a first rotation member 310 connected to the first housing 110 and a second rotation member 320 connected to the second housing 120. According to an embodiment, the first rotation member 310 may face a first display region (e.g., the first display region 131a of FIG. 1), and the second rotation member 320 may face a second display region (e.g., the second display region 131b of FIG. 1).

Figure 6:
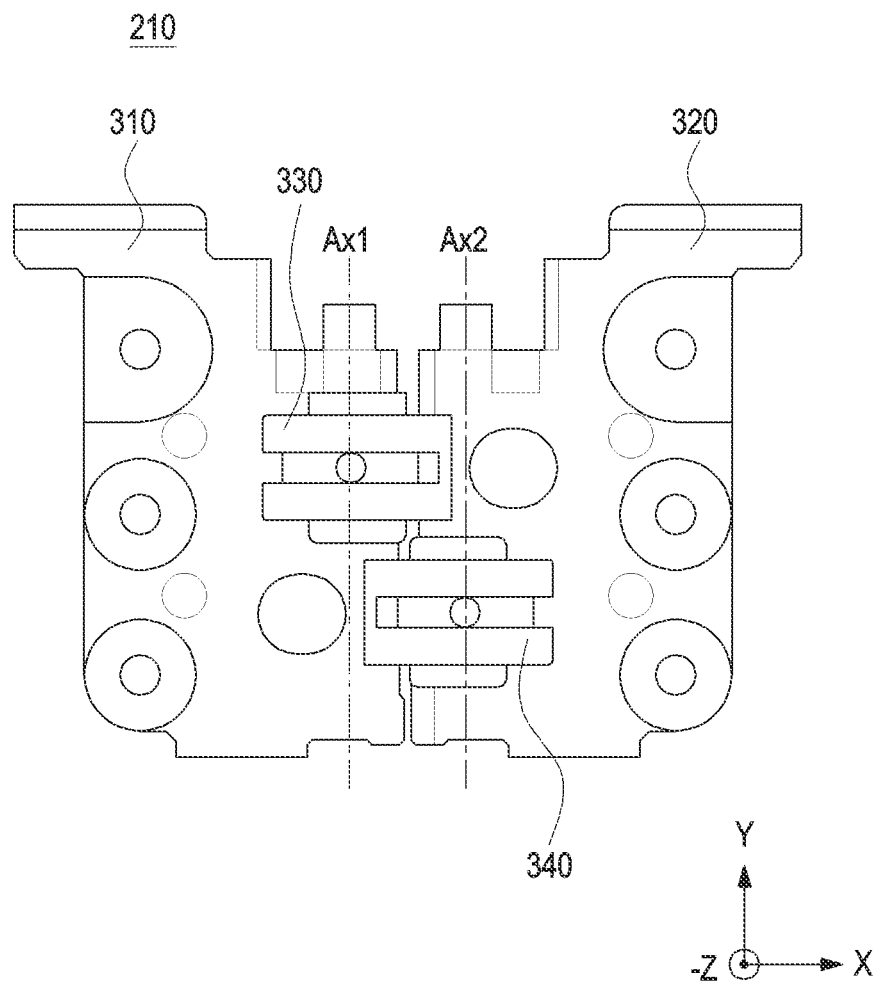
FIG. 6 is a top view illustrating a rotation structure according to an embodiment of the disclosure.

According to various embodiments, the rotation bracket 350 may accommodate a first rail member (e.g., a first rail member 330 of FIG. 6) and a second rail member (e.g., a second rail member 340 of FIG. 6). For example, the rotation bracket 350 may include a first accommodation space 351 providing the first rotation axis Ax1 and a second accommodation space 352 providing the second rotation axis Ax2 substantially parallel to the first rotation axis Ax1. According to an embodiment, the first accommodation space 351 may guide the rotation of the first rail member 330, and the second accommodation space 352 may guide the rotation of the second rail member 340. According to an embodiment, the first rotation member 310 may rotate together with the first rail member 330 around the first rotation axis Ax1, and the second rotation member 320 may rotate together with the second rail member 340 around the second rotation axis Ax2.

According to various embodiments, the rotation members 310 and 320 may include pin holes 311 and 321 for accommodating pin members 241 and 242 therein. For example, the first rotation member 310 may include the first pin hole 311 in which a first pin member 241 is located, and the second rotation member 320 may include the second pin hole 321 in which a second pin member 242 is located. According to an embodiment, the pin holes 311 and 321 may be holes that penetrate in the length direction (e.g., the Y-axis direction) of the hinge module 200 and extend in the width direction (e.g., the X-axis direction) of the hinge module 200.

According to various embodiments, the interlocking structure 220 may link the rotation of a first housing (e.g., the first housing 110 of FIG. 1) to the rotation of a second housing (e.g., the second housing 120 of FIG. 1). According to an embodiment, the interlocking structure 220 may rotate the second housing 120 at an angle substantially equal to a rotation angle of the first housing 110 by using a gear (e.g., a first gear shaft 221, a second gear shaft 222, and/or an idle gear 223).

According to various embodiments, the hinge module 200 (e.g., the interlocking structure 220) may include the gear shafts 221 and 222 and/or the idle gear 223.

According to various embodiments, the gear shafts 221 and 222 may include the first gear shaft 221 rotatable around a first interlocking axis Ax3 and the second gear shaft 222 rotatable around a second interlocking axis Ax4. According to an embodiment, a first gear 221a of the first gear shaft 221 and a second gear 222a of the second gear shaft 222 may be meshed with each other to interlock the first housing (e.g., the first housing 110 of FIG. 1) with the second housing (e.g., the second housing 120 of FIG. 1). For example, a force transmitted from the first rotation member 310 coupled to the first housing 110 may be transferred to the first gear shaft 221 through a first arm member 231. The first gear shaft 221 may be meshed with the second gear shaft 222, and the second gear shaft 222 may rotate in a direction different from the rotation direction of the first gear shaft 221. A force transmitted to the second gear shaft 222 may be transferred to a second arm member 232 and/or the second housing 120. According to an embodiment, ends of the gear shafts 221 and 222 may be inserted into the rotation bracket 350.

According to various embodiments, the hinge module 200 (e.g., the interlocking structure 220) may include gear shaft support members 224a, 224b, and 224c. According to an embodiment, the gear shaft support members 224a, 224b, and 224c may include at least one hole for receiving the first gear shaft 221, the second gear shaft 222, and/or the idle gear 223. For example, the gear shaft support members 224a, 224b, and 224c may prevent or reduce detachment of the first gear shaft 221, the second gear shaft 222, and/or the idle gear 223. According to an embodiment, the gear shaft support members 224a, 224b, and 224c may include a plurality of gear shaft support members (e.g., a first gear shaft support member 224a, a second gear shaft support member 224b, and a third gear shaft support member 224c) arranged in the length direction (e.g., the Y-axis direction) of the hinge module 200.

According to an embodiment, the interlocking structure 220 may include a gear cover (not shown) for protecting the first gear shaft 221 and/or the second gear shaft 222 from external impacts. The gear cover (not shown) may surround at least a part of the first gear 221a, the second gear 222a, and/or the idle gear 223.

According to various embodiments, the fixing structure may position the first housing (e.g., the first housing 110 of FIG. 1) and the second housing (e.g., the second housing 120 of FIG. 1) at a certain angle. For example, the fixing structure may apply a pressure to the rotation structure 210 in the length direction (e.g., the Y-axis direction) of the hinge module 200, to prevent or reduce movement and/or rotation of the first housing 110 and/or the second housing 120. For example, when a user applies an external force equal to or greater than a predetermined value, the hinge module 200 may allow the first housing 110 and/or the second housing 120 to rotate, whereas when no external force is applied or an external force less than the predetermined value is applied, the hinge module 200 may keep the first housing 110 and/or the second housing 120 stationary by using the fixing structure.

According to various embodiments, the hinge module 200 (e.g., the fixing structure 230) may include the arm members 231 and 232. According to an embodiment, the arm members 231 and 232 may include the first arm member 231 connected to the first rotation member 310 and the second arm member 232 connected to the second rotation member 320. According to an embodiment, the first arm member 231 may rotate together with the first gear shaft 221 around the first interlocking axis Ax3, and the second arm member 232 may rotate together with the second gear shaft 222 around the second interlocking axis Ax4. The rotation axes Ax1 and Ax2 may be different from interlocking axes Ax3 and Ax4 of the gear shafts 221 and 222. For example, the first rotation axis Ax1, the second rotation axis Ax2, a first interlocking axis Ax3, and a second interlocking axis Ax4 may be substantially parallel.

According to various embodiments, the arm members 231 and 232 may be connected to the pin members 241 and 242. For example, the first arm member 231 may include a first recess 231a for accommodating the first pin member 241, and the second arm member 232 may include a second recess 232a for accommodating the second pin member 242. The recesses 231a and 232a may have the shape of grooves or holes. According to an embodiment, the arm members 231 and 232 may be connected to the rotation members 310 and 320 by using the pin members 241 and 242. For example, at least a part of the first pin member 241 connected to the first arm member 231 may be accommodated in the first pin hole 311 of the first rotation member 310, and at least a part of the second pin member 242 connected to the second arm member 232 may be accommodated in the second pin hole 321 of the second rotation member 320.

According to various embodiments, the arm members 231 and 232 may slide with respect to the rotation members 310 and 320. According to an embodiment, the first pin member 241 connected to the first arm member 231 may slide in the width direction (e.g., the X-axis direction) within the first pin hole 311, and the second pin member 242 connected to the second arm member 232 may slide in the width direction (e.g., the X-axis direction) within the second pin hole 321.

According to various embodiments, the arm members 231 and 232 may include cam structures 233a, 233b, 233c, 234a, 234b, and 234c. For example, the first arm member 231 may include first cam structures 233a, 233b, and 233c, and the second arm member 232 may include second cam structures 234a, 234b, and 234c. According to an embodiment, the first cam structures 233a, 233b, and 233c may surround the first gear shaft 221, and the second cam structures 234a, 234b, and 234c may surround the second gear shaft 222. According to an embodiment, the first cam structures 233a, 233b, and 233c may be mounted or fixed while enclosing the outer circumferential surface of the first gear shaft 221. As the first cam structures 233a, 233b, and 233c rotate together with the first gear shaft 221, the first arm member 231 may rotate substantially around the rotation axis (e.g., the first interlock axis Ax3) of the first gear shaft 221. According to an embodiment, the first cam structures 233a, 233b, and 233c may be integrally formed with the first arm member 231. According to an embodiment, the second cam structures 234a, 234b, and 234c may be mounted or fixed, while enclosing the outer circumferential surface of the second gear shaft 222. As the second cam structures 234a, 234b, and 234c rotate together with the second gear shaft 222, the second arm member 232 may rotate substantially around the rotation axis (e.g., the second interlocking axis Ax4) of the second gear shaft 222. According to an embodiment, the second cam structures 234a, 234b, and 234c may be integrally formed with the second arm member 232. According to an embodiment, the first cam structures 233a, 233b, and 233c may include a plurality of first cam structures (e.g., a $(1\text{-}1)^{th}$ cam structure 233a, a $(1\text{-}2)^{th}$ cam structure 233b, and a $(1\text{-}3)^{th}$ cam structure 233c) located along the length direction (e.g., the Y-axis direction) of the hinge module 200. The second cam structures 234a, 234b, and 234c may include a plurality of second cam structures (e.g., a $(2\text{-}1)^{th}$ cam structure 234a, a $(2\text{-}2)^{th}$ cam structure 234b, and a $(2\text{-}3)^{th}$ cam structure 234c) located along the length direction (e.g., the Y-axis direction) of the hinge module 200.

According to various embodiments, the hinge module 200 (e.g., the fixing structure 230) may include at least one cam member 235a, 235b, and 235c and at least one elastic member 236a, 236b, 236c, 236d, 236e, and 236f. The cam members 235a, 235b, and 235c may provide a pressure or an elastic force to the arm members 231 and 232. According to an embodiment, the cam members 235a, 235b, and 235c may face the first cam structures 233a, 233b, and 233c of the first arm member 231 and/or the second cam structures 234a, 234b, and 234c of the second arm member 232, and provide an elastic force to the first cam structures 233a, 233b, and 233c and/or the second cam structures 234a, 234b, and 234c. According to an embodiment, the cam members 235a, 235b, 235c may include a first cam member 235a facing the $(1\text{-}1)^{th}$ cam structure 233a and the $(2\text{-}1)^{th}$ cam structure 234a, a second cam member 235b facing the $(1\text{-}2)^{th}$ cam structure 233b and the $(2\text{-}2)^{th}$ cam structure 234b, and a third cam member 235c facing the $(1\text{-}3)^{th}$ cam structure 233c and the $(2\text{-}3)^{th}$ cam structure 234c.

According to an embodiment, the elastic members 236a, 236b, 236c, 236d, 236e, and 236f may apply an elastic force to the cam members 235a, 235b, and 235c in the length direction (e.g., the Y-axis direction) of the hinge module 200, and the cam members 235a, 235b, and 235c may contact the cam structures 233a, 233b, 233c, 234a, 234b, and 234c. According to an embodiment, the elastic members 236a, 236b, 236c, 236d, 236e, and 236f may include a $(1\text{-}1)^{th}$ elastic member 236a and a $(1\text{-}2)^{th}$ elastic member 236b which are connected to the first cam member 235a, a $(2\text{-}1)^{th}$ elastic member 236c and a $(2\text{-}2)^{th}$ elastic member 236d which are connected to the second cam member 235b, and a $(2\text{-}1)^{th}$ elastic member 236e and a $(3\text{-}2)^{th}$ elastic member 236f which are connected to the third cam member 235c. According to an embodiment, the elastic members 236a, 236b, 236c, 236d, 236e, and 236f may include springs.

According to various embodiments, the hinge module (e.g., torque transmission structures 240) may transmit at least a part of a force applied to the first housing 110 to the second housing 120 or transmit at least a part of a force applied to the second housing 120 to the first housing 110. For example, the hinge module 200 may transfer the rotation of the rotation members 310 and 320 to the arm members 231 and 232 or the rotation of the arm members 231 and 232 to the rotation members 310 and 320 by using the pin members 241 and 242.

According to various embodiments, the hinge module (e.g., the torque transmission structures 240) may include the first pin member 241 and the second pin member 242. According to an embodiment, the first pin member 241 may have one end coupled with the first recess 231a of the first arm member 231 and the other end connected slidably in the first pin hole 311 of the first rotation member 310. The second pin member 242 may have one end coupled with the second recess 232a of the second arm member 232, and the other end connected slidably in the second pin hole 321 of the second rotation member 320. According to an embodiment, the pin members 241 and 242 may move based on folding or unfolding of the electronic device (e.g., the electronic device 100 of FIG. 1) and/or the hinge module 200. For example, at least a part of the first pin member 241 may slide within the first pin hole 311, and at least a part of the second pin member 242 may slide within the second pin hole 321.

According to various embodiments, the hinge module 200 (e.g., the interlocking structure 220) may include a first fixing clip 226a connected to one end of the first gear shaft 221 and a second fixing clip 226b connected to one end of the second gear shaft 222. According to an embodiment, the fixing clips 226a and 226b may prevent or reduce detachment of the cam members and/or the elastic members.

According to various embodiments, the hinge module 200 may include a first support ring 225a surrounding at least a part of the first gear shaft 221 and a second support ring 225b surrounding at least a part of the second gear shaft 222. According to an embodiment, the support rings 225a and 225b may be disposed between a gear shaft support member (e.g., the third gear shaft support member 224c) and the fixing clips (e.g., the first fixing clip 226a and the second fixing clip 226b). According to an embodiment, the support rings 225a and 225b may distribute a pressure between the third gear shaft support member 224c and the fixing clips 226a and 226b. For example, the support rings 225a and 225b may be interpreted as washers.

According to various embodiments, the hinge module 200 (e.g., the torque transmission structures 240) may include a third fixing clip 243 connected to one end of the first pin member 241 and a fourth fixing clip 244 connected and to one end of the second pin member 242. According to an embodiment, the fixing clips 243 and 244 may prevent or reduce detachment of the pin members 241 and 242.

FIG. 6 is a top view illustrating a rotation structure according to an embodiment of the disclosure.

Figure 7:
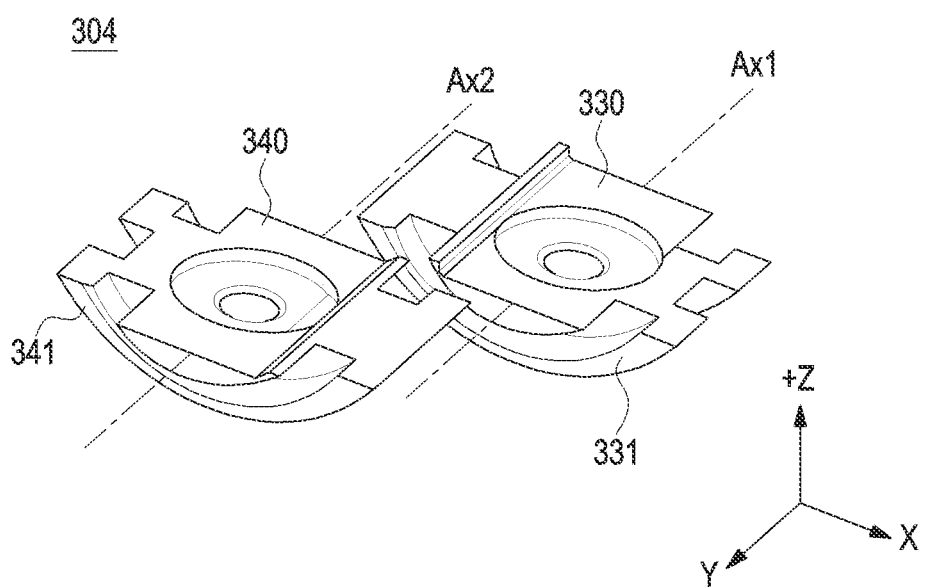
FIG. 7 is a perspective view illustrating a rail member according to an embodiment of the disclosure.

FIG. 7 is a perspective view illustrating a rail member according to an embodiment of the disclosure.

Referring to FIGS. 6 and 7, a rotation structure 210 may include a first rotation member 310, a second rotation member 320, and a rail member 304 (e.g., a first rail member 330 and/or a second rail member 340). The configurations of the rotation structure 210, the first rotation member 310, and the second rotation member 320 of FIG. 6 and/or FIG. 7 may be wholly or partially identical to those of the rotation structure 210, the first rotation member 310, and the second rotation member 320 of FIG. 4 and/or FIG. 5.

According to various embodiments, the rail member 304 may be rotatably connected to a rotation bracket (e.g., the rotation bracket 350 of FIG. 5). For example, the first rail member 330 may be accommodated in a first accommodation space (e.g., the first accommodation space 351 of FIG. 5) of the rotation bracket (e.g., the rotation bracket 350 of FIG. 5) and rotate around the first rotation axis Ax1, and the second rail member 340 may be accommodated in a second accommodation space (e.g., the second accommodation space 352 of FIG. 5) and rotate around the second rotational axis Ax2. According to an embodiment, the first rail member 330 may include a first rail 331 surrounding the first rotation axis Ax1, apart from the first rotation axis Ax1. The second rail member 340 may include a second rail 341 surrounding the second rotation axis Ax2, apart from the second rotation axis Ax2. According to an embodiment, the first rail 331 may move (e.g., rotate) along a guide protrusion (not shown) formed on the rotation bracket 350. The second rail 341 may move along a guide protrusion (not shown) formed on the rotation bracket 350. According to an embodiment, at least a part of each of the rails 331 and 341 may be formed in the shape of an arc. According to various embodiments, the first rotation member 310 may be connected to the first rail member 330, and the second rotation member 320 may be connected to the second rail member 340.

According to various embodiments, the rotation members 310 and 320 may be substantially paramagnetic. For example, the rotation members 310 and 320 may be magnetized to become magnets, when an external magnetic field is applied, and may lose the magnetic property, when the external magnetic field is removed. According to an embodiment, the permeability (e.g., a first permeability) of the rotation members 310 and 320 may be 1 to 1.1. For example, the first permeability may be 1.003 to 1.02 henries per meter (H/m). A permeability may be interpreted as a degree to which a material is magnetized in response to an external magnetic field. According to an embodiment, the rotation members 310 and 320 may contain austenite-based stainless steel. For example, the rotation members 310 and 320 may contain stainless steel (SUS) 3 series (e.g., SUS 304, SUS 310, SUS 316, or SUS 321). According to an embodiment, the rotation members 310 and 320 may include stainless steel containing 12% to 20% chromium (Cr) and 8% to 16% nickel (Ni).

According to various embodiments, the rail members 330 and 340 may be substantially ferromagnetic. For example, the rail members 330 and 340 may be magnetized to become magnets on their own, even when no external magnetic field is applied. According to an embodiment, the rail members 330 and 340 may be formed of a material having a second permeability. The first permeability of the rotation members 310 and 320 may be lower than the second permeability of the rail members 330 and 340. According to an embodiment, the rail members 330 and 340 may contain ferrite-based stainless steel or martensite-based stainless steel.

According to various embodiments, the yield strength and/or rigidity of the rail members 330 and 340 may be greater than the yield strength and/or rigidity of the rotation members 310 and 320. A yield strength may refer to a stress at which a material begins to undergo macroscopic plastic deformation. According to an embodiment, the rail members 330 and 340 may be formed of a material having a yield strength greater than that of the rotation members 310 and 320, thereby reducing or preventing breakage of the hinge module (e.g., the hinge module 200 of FIG. 5) and/or the rotation structure 210 caused by external impacts. According to an embodiment, the rail members 330 and 340 may contain a material (e.g., titanium) having a rigidity supporting the rotation of the hinge module 200 in addition to stainless steel.

Figure 8:
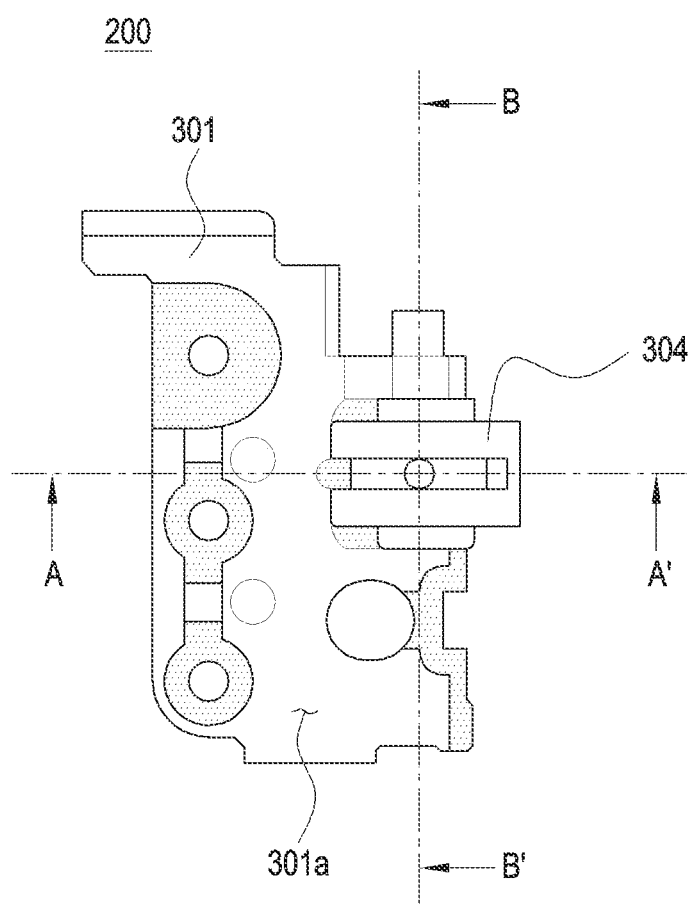
FIG. 8 is a top view illustrating a hinge module including a rotation member and a rail member according to an embodiment of the disclosure.

FIG. 8 is a top view illustrating a hinge module including a rotation member and a rail member according to an embodiment of the disclosure.

Figure 9:
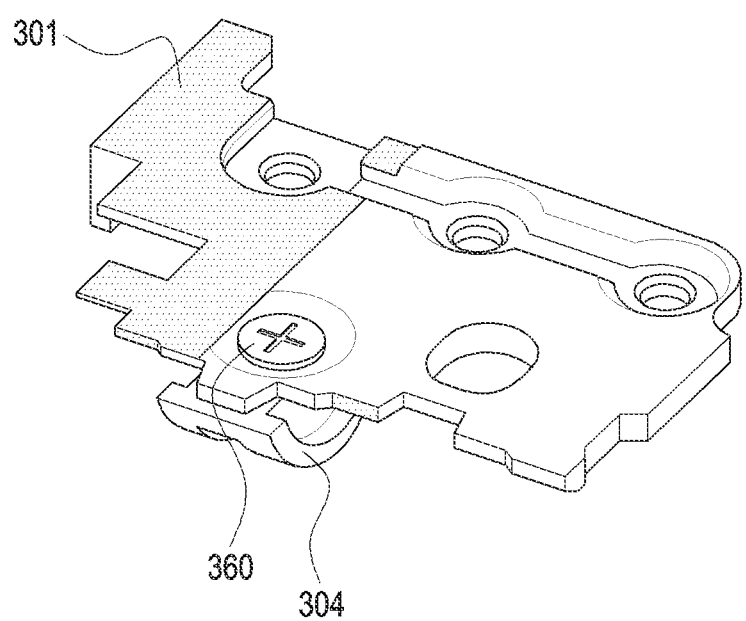
FIG. 9 is a perspective view illustrating a hinge module including a rotation member and a rail member according to an embodiment of the disclosure.

FIG. 9 is a perspective view illustrating a hinge module including a rotation member and a rail member according to an embodiment of the disclosure.

Figure 10A:
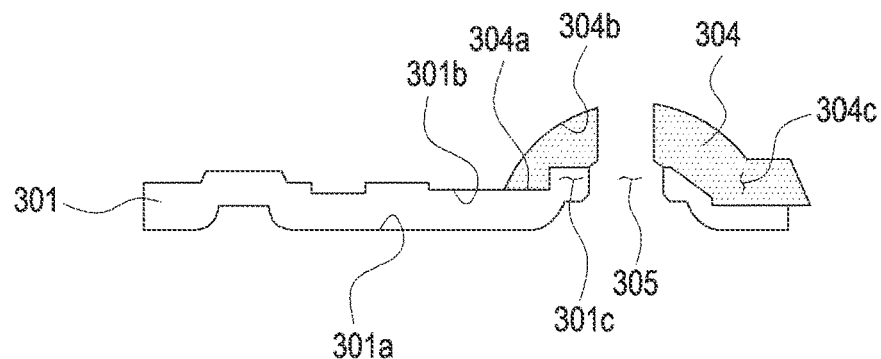
FIG. 10A is a cross-sectional view taken along line A-A' of FIG. 9 according to an embodiment of the disclosure.

FIG. 10A is a cross-sectional view taken along line A-A' of FIG. 9 according to an embodiment of the disclosure.

Figure 10B:
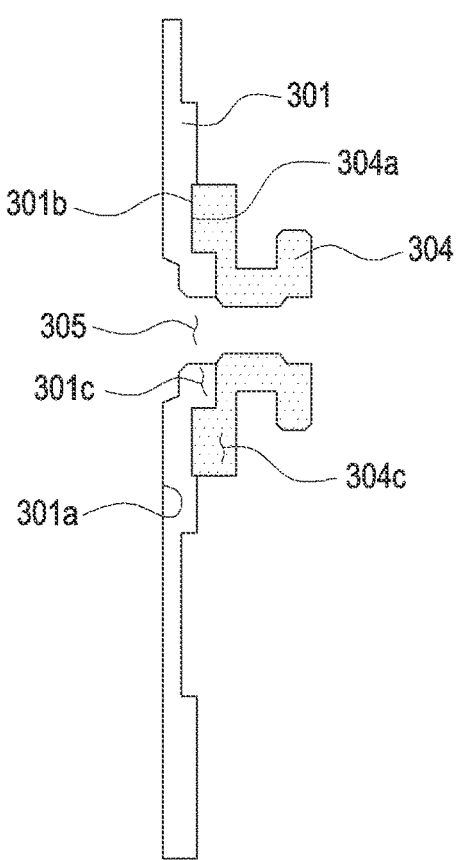
FIG. 10B is a cross-sectional view taken along line B-B' of FIG. 9 according to an embodiment of the disclosure.

FIG. 10B is a cross-sectional view taken along line B-B' of FIG. 9 according to an embodiment of the disclosure.

Referring to FIGS. 8, 9, 10A, and 10B, a hinge module 200 may include a rotation member 301 and a rail member 304. The configurations of the rotation member 301 and the rail member 304 of FIGS. 8, 9, 10A and 10B may be wholly or partially identical to those of the rotation members 310 and 320 and the rail members 330 and 340 of FIG. 6.

According to various embodiments, the rotation member 301 may be coupled with the rail member 304. According to an embodiment, at least a part of the rail member 304 may surround at least a part of the rotation member 301. For example, the rotation member 301 may include a front surface 301a facing a display (e.g., the display 130 of FIG. 3), a rear surface 301b opposite to the front surface 301a, and a protrusion region 301c protruding from the rear surface 301b. The rail member 304 may include a fastening region 304c surrounding at least a part of the protrusion region 301c. The rail member 304 may include a fastening region 304c surrounding at least a part of the protrusion region 301c. According to an embodiment, the rail member 304 may be coupled with the rotation member 301 not to rotate relative to the rotation member 301. For example, the fastening region 304c may include at least three or more surfaces facing the rotation member 301. According to an embodiment, the rail member 304 may be detachably coupled with the rotation member 301. For example, the rail member 304 may be a separate component from the rotation member 301.

According to an embodiment, a first rotation member (e.g., the first rotation member 310 of FIG. 6) and a second rotation member (e.g., the second rotation member 320 of FIG. 6) may include a first front surface and a second front surface corresponding to the front surface 301a, a first rear surface and a second rear surface corresponding to the rear surface 301b, and a first protrusion region and a second protrusion region corresponding to the protrusion region 301c, respectively.

According to one embodiment, a first rail member (e.g., the first rail member 330 of FIG. 6) and a second rail member (e.g., the second rail member 340 of FIG. 6) may include a first fastening region and a second fastening region corresponding to the fastening region 304c, respectively.

According to various embodiments, the rail member 304 may include a support surface 304a facing the rotation member 301, and a curved structure 304b extending from the support surface 304a and formed around a rotation axis (e.g., the first rotation axis Ax1 or the second rotation axis Ax2). According to an embodiment, the rail member 304 may be disposed on the rear surface 301b of the rotation member 301. For example, the support surface 304a of the rail member 304 may face the rear surface 301b. According to an embodiment, at least a part of the rail member 304 may be interpreted as a semi-moon or semi-circular rail structure. For example, at least a part of the curved structure 304b of the rail member 304 may be formed to be spaced apart from the rotation axis (e.g., the first rotation axis Ax1 or the second rotation axis Ax2) by a specified distance.

According to an embodiment, a first rail member (e.g., the first rail member 330 of FIG. 6) and a second rail member (e.g., the second rail member 340 of FIG. 6) may include a first support surface and a second support surface corresponding to the support surface 304a, and a first curved structure and a second curved structure corresponding to the curved structure 304b, respectively.

According to various embodiments, the hinge module 200 may include a fastening member 360 for connecting the rotation member 310 to the rail member 304. According to an embodiment, at least a part of the fastening member 360 may be positioned in a recess 305, and the rail member 304 may be fixed to the rotation member 310 by means of the fastening member 360. According to an embodiment, the fastening member 360 may be a screw or boss structure.

Figure 11:
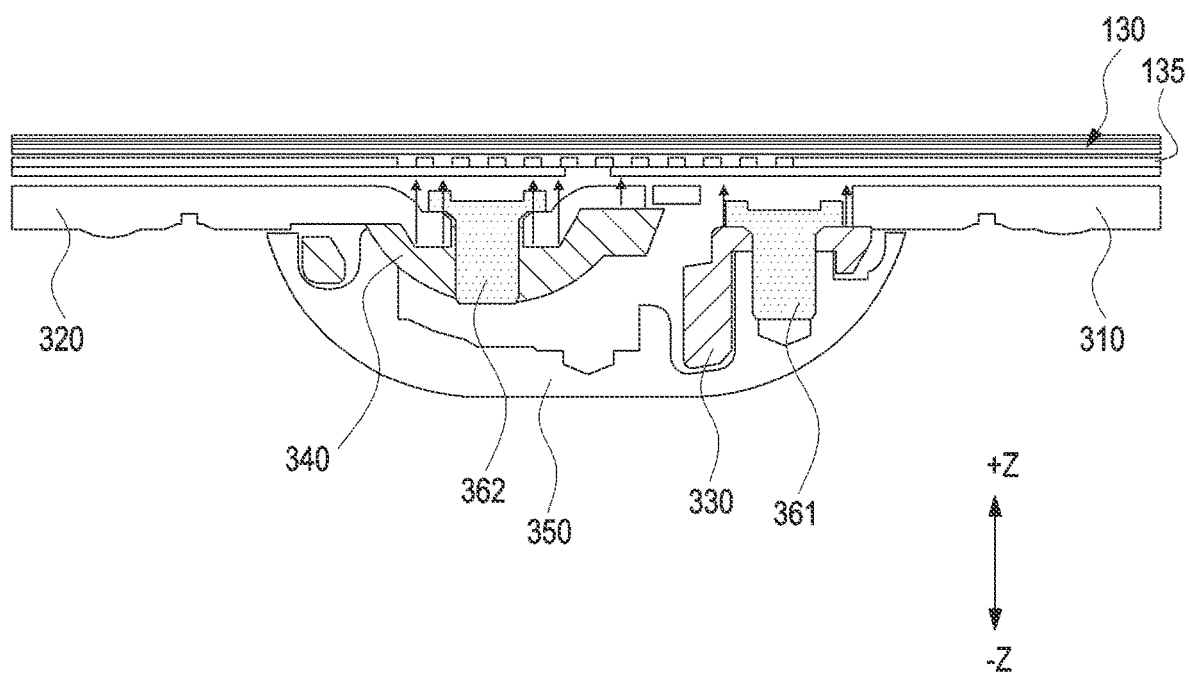
FIG. 11 is a cross-sectional view illustrating an electronic device according to an embodiment of the disclosure.

FIG. 11 is a cross-sectional view illustrating an electronic device according to an embodiment of the disclosure.

Referring to FIG. 11, an electronic device 100 may include a display 130, a first rotation member 310, a second rotation member 320, a first rail member 330, a second rail member 340, and a rotation bracket 350. The configurations of the display 130, the first rotation member 310, the second rotation member 320, the first rail member 330, the second rail member 340, and the rotation bracket 350 of FIG. 11 may be wholly or partially identical to those of the display 130, the first rotation member 310, the second rotation member 320, the first rail member 330, and the second rail member 340 of FIG. 3, FIG. 5, and/or FIG. 6.

According to various embodiments, the display 130 may include a touch circuit 135. The touch circuit 135 may include a touch sensor and a touch sensor integrated circuit (IC) for controlling the touch sensor. The touch sensor IC may control the touch sensor to detect a touch input or a hovering input at a specific position of the display 130. For example, the touch sensor IC may detect the touch input or the hovering input by measuring a change in a signal (e.g., a voltage, a light intensity, a resistance, or an electric charge amount) at the specific position of the display 130. The touch sensor IC may provide information about (e.g., a position, an area, a pressure, or a time of) the sensed touch input or hovering input to a processor (not shown) of the electronic device 100.

According to various embodiments, the rotation members 310 and 320 may face at least a part of the touch circuit 135. For example, the rotation members 310 and 320 may be disposed below the display 130 (e.g., in a −Z direction). According to an embodiment, the first rotation member 310 may be connected to a first display region (e.g., the first display region 131a of FIG. 3), and the second rotation member 320 may be connected to a second display region (e.g., the second display region 131b of FIG. 3).

According to various embodiments, the rotation members 310 and 320 may be formed to be substantially paramagnetic. Since the rotation members 310 and 320 adjacent to or connected to the display 130 are formed to be substantially paramagnetic, interference with a magnetic field transmitted to the touch circuit 135 of the display 130 may be reduced.

According to various embodiments, a first fastening member 361 for fixing the first rail member 330 to the first rotation member 310 and a second fastening member 362 for fixing the second rail member 340 to the second rotation member 320 may be included. The configurations of the first fastening member 361 and the second fastening member 362 may be wholly or partially identical to that of the fastening member 360 of FIG. 9.

Figure 12A:
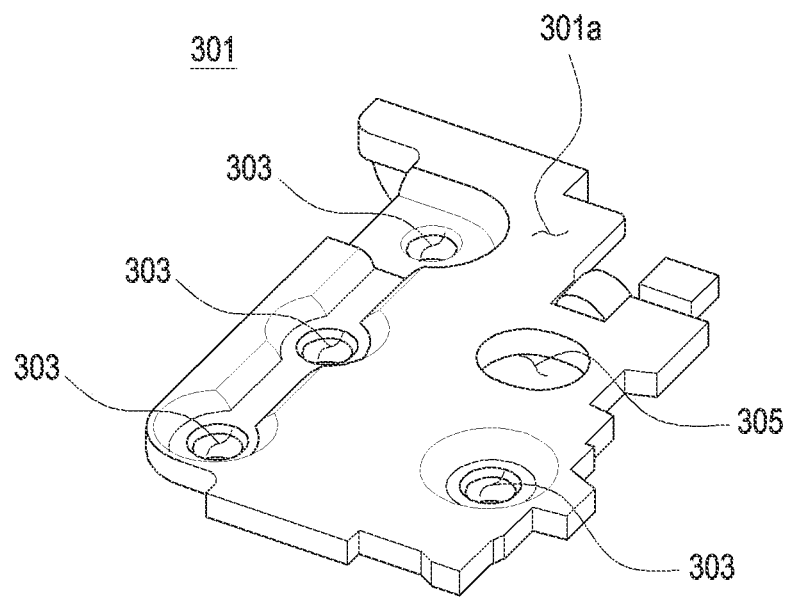
FIG. 12A is a front perspective view illustrating a rotation member according to an embodiment of the disclosure.

FIG. 12A is a front perspective view illustrating a rotation member according to an embodiment of the disclosure.

Figure 12B:
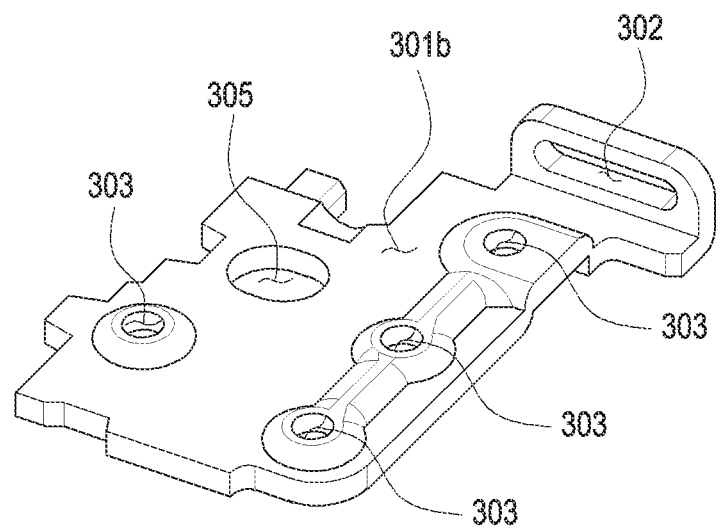
FIG. 12B is a rear perspective view illustrating the rotation member according to an embodiment of the disclosure.

FIG. 12B is a rear perspective view illustrating the rotation member according to various embodiments of the disclosure.

Figure 13:
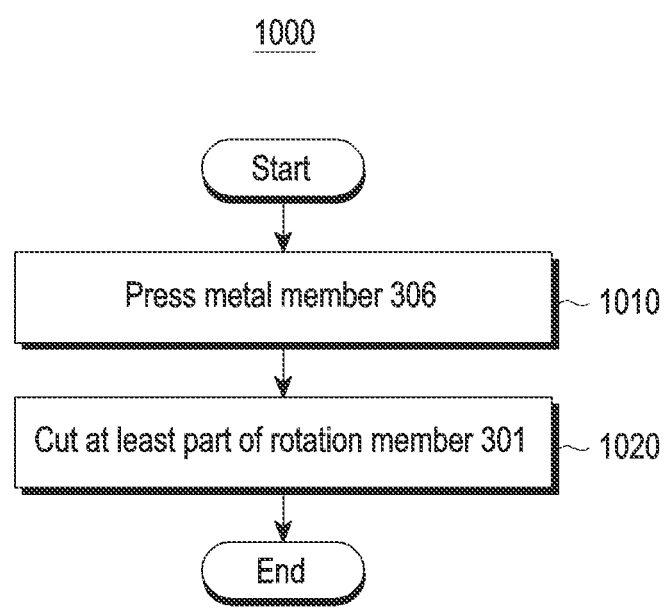
FIG. 13 is a flowchart illustrating a process of manufacturing a hinge module according to an embodiment of the disclosure.

FIG. 13 is a flowchart illustrating a process of manufacturing a hinge module according to an embodiment of the disclosure.

Referring to FIGS. 12A and 12B, the rotation member 301 may include a pin hole 302, at least one opening 303, and the recess 305. Referring to FIG. 13, a method 1000 of manufacturing a hinge module (e.g., the hinge module 200 of FIG. 4) may include an operation 1010 of pressing a metal member 306 and an operation 1020 of cutting at least a part of the rotation member 301. The configuration of the rotation member 301 of FIG. 12A, FIG. 12B, and/or FIG. 13 may be wholly or partially identical to the configurations of the rotation members 310 and 320 of FIG. 5.

According to various embodiments, the rotation member 301 may be formed in the operation 1010 of pressing the metal member 306. For example, the manufacturing process of the hinge module 200 may include a pressing process. According to an embodiment, the metal member 306 may be inserted into a mold (not shown) for manufacturing the rotation member 301 and then pressed and/or heated. According to an embodiment, the metal member 306 may include austenite-based stainless steel for which the pressing process may be used. According to an embodiment, the metal member 306 may be interpreted as a metal rolled for the pressing process. According to an embodiment, the metal member 306 may be formed to have a specified yield strength and/or elongation in the rolling process.

According to an embodiment, the rotation member 301 may formed with lower manufacturing cost and/or in a shorter manufacturing time in the pressing process than by metal powder injection molding (MIM). According to an embodiment, the rotation member 301 may include the front surface 301a facing at least a part of the display 130 and the rear surface 301b opposite to the front surface 301a.

According to various embodiments, the rotation member 301 may include the at least one opening 303 for connecting to a housing (e.g., the housings 110 and 120 of FIG. 1) and/or a display (e.g., the display 130 of FIG. 3). According to an embodiment, the opening 303 may be a through hole formed between the front surface 301a and the rear surface 301b. According to an embodiment, the rotation member 301 may be connected to the first housing 110, the second housing 120, and/or the display 130 by a coupling member (not shown) located in the opening 303.

According to various embodiments, the rotation member 301 may include the recess 305 for accommodating a rail member (e.g., the rail members 330 and 340 of FIG. 6). According to an embodiment, the recess 305 may be a groove formed into the rear surface 301b or a through hole formed between the front surface 301a and the rear surface 301b.

According to various embodiments, at least a part of the opening 303, the pin hole 302 (e.g., the pin holes 311 and 321 of FIG. 5), and the recess 305 may be formed in the pressing process. For example, a mold (not shown) for manufacturing the rotation member 301 may include a shape for at least a part of the pin hole 302, at least a part of the opening 303, and/or at least a part of the recess 305.

According to various embodiments, at least a part of the rotation member 301 may be cut in operation 1020. For example, the manufacturing process of the hinge module 200 may include computer numerical control (CNC) machining. The dimensions of the rotation member 301 may be adjusted in the cutting process of operation 1020. According to an embodiment, a surface (e.g., the front surface 301a and/or the rear surface 301b) of the rotation member 301 may be formed by cutting the rotation member 301 formed in the pressing process. For example, the surface roughness of the front surface 301a and/or the rear surface 301b of the rotation member 301 may be adjusted in the cutting process. According to an embodiment, an inner diameter of the pin hole 302, the opening 303, and/or the recess 305 formed in the rotation member 301 may be adjusted by cutting the rotation member 301 formed in the pressing process.

According to various embodiments of the disclosure, an electronic device (e.g., the electronic device 100 of FIG. 1) may include a housing (e.g., the housings 110 and 120 of FIG. 1) including a first housing (e.g., the first housing 110 of FIG. 1) and a second housing (e.g., the second housing 120 of FIG. 1), a display (e.g., the display 130 of FIG. 3) including a first display region (e.g., the first display region 131a of FIG. 3) connected to the first housing and a second display region (e.g., the second display region 131b of FIG. 3) connected to the second housing, and a hinge module (e.g., the hinge module 200 of FIG. 4) connected to the first housing and the second housing. The hinge module may include a rotation bracket (e.g., the rotation bracket 350 of FIG. 5) including a first accommodation space (e.g., the first accommodation space 351 of FIG. 5) providing a first rotation axis (e.g., the first rotation axis Ax1 of FIG. 4) and a second accommodation space (e.g., the second accommodation space 352 of FIG. 5) providing a second rotation axis (e.g., the second rotation axis Ax2 of FIG. 4), a rotation member (e.g., the rotation members 310 and 320 of FIG. 5) including a first rotation member (e.g., the first rotation member 310 of FIG. 5) connected to the first display region and a second rotation member (e.g., the second rotation member 320 of FIG. 5) connected to the second display region, and a rail member (e.g., the rail members 330 and 340 of FIG. 6) including a first rail member (e.g., the first rail member 330 of FIG. 6) coupled to the first rotation member and configured to rotate in the first accommodation space, and a second rail member (e.g., the second rail member 340 of FIG. 6) connected to the second rotation member and configured to rotate in the second accommodation space. A first permeability of the rotation member may be lower than a second permeability of the rail member.

According to various embodiments, the first permeability of the rotation member may be 1 to 1.1 H/m.

According to various embodiments, the rotation member may include a front surface (e.g., the front surface 301a of FIG. 10A) facing at least a part of the display and a rear surface (e.g., the rear surface 301b of FIG. 10A) opposite to the front surface, and the rail member may be disposed on the rear surface.

According to various embodiments, the rotation member may include a protrusion region (e.g., the protrusion region 301c of FIG. 10A) protruding from the rear surface, and the rail member may include a fastening region (e.g., the fastening region 304c of FIG. 10A) surrounding at least a part of the protrusion region.

According to various embodiments, the hinge module may include a fastening member (e.g., the fastening member 360 of FIG. 9) including a first fastening member (e.g., the first fastening member 361 of FIG. 11) configured to fix the first rail member to the first rotation member, and a second fastening member (e.g., the second fastening member 362 of FIG. 11) configured to fix the second rail member to the second rotation member.

According to various embodiments, the rotation member may include austenite-based stainless steel, and the rail member may include at least one of ferrite-based stainless steel or martensite-based stainless steel.

According to various embodiments, the rail member may include a support surface (e.g., the support surface 304a of FIG. 10A) facing the rotation member, and a curved structure (e.g., the curved structure 304b of FIG. 9) formed to extend from the support surface and spaced apart from the first rotation axis or the second rotation axis by a specified distance.

According to various embodiments, the hinge module may include a first arm member (e.g., the first arm member 231 of FIG. 5) connected to the first rotation member and including a first cam structure (e.g., the first cam structures 233a, 233b, and 233c of FIG. 5), and a second arm member (e.g., the second arm member 232 of FIG. 5) connected to the second rotation member and including a second cam structure (e.g., the second cam structures 234a, 234b, and 234c).

According to various embodiments, the hinge module may include a first gear shaft (e.g., the first gear shaft 221 of FIG. 5) connected to the first arm member, a second gear shaft (e.g., the second gear shaft 222 of FIG. 5) connected to the second arm member, and a plurality of idle gears (e.g., the idle gear 223 of FIG. 5) connected to the first gear shaft and the second gear shaft.

According to various embodiments, the hinge module may include at least one cam member (e.g., the cam members 235*a*, 235*b*, and 235*c* of FIG. 5) facing the first cam structure and the second cam structure, and an elastic member (e.g., the elastic members 236*a*, 263*b*, 236*c*, 236*d*, 236*e*, and 236*f* of FIG. 5) facing the cam member and configured to provide an elastic force to the first cam structure or the second cam structure.

According to various embodiments, the hinge module may include a first pin member (e.g., the first pin member 241 of FIG. 5) connected to the first arm member and a second pin member (e.g., the second pin member 242 of FIG. 5) connected to the second arm member. The first rotation member may include a first pin hole (e.g., the first pin hole 311 of FIG. 5) for accommodating the first pin member therein, and the second rotation member may include a second pin hole (e.g., the second pin hole 321 of FIG. 5) for accommodating the second pin member therein.

According to various embodiments, at least a part of the first pin member may be configured to slide within the first pin hole, and at least a part of the second pin member may be configured to slide within the second pin hole.

According to various embodiments, the display may include a touch circuit (e.g., the touch circuit 135 of FIG. 11) configured to detect a touch input or a hovering input to the display, and the rotation member may face at least a part of the touch circuit.

According to various embodiments, a yield strength of the rail member may be greater than a yield strength of the rotation member.

According to various embodiments, the rail member may be detachably connected with the rotation member.

According to various embodiments, the first rotation member may be disposed between the first display region and the first rail member, and the second rotation member may be disposed between the second display region and the second rail member.

According to various embodiments of the disclosure, an electronic device (e.g., the electronic device 100 of FIG. 1) may include a housing (e.g., the housings 110 and 120 of FIG. 1) including a first housing (e.g., the first housing 110 of FIG. 1) and a second housing (e.g., the second housing 120 of FIG. 1), a display (e.g., the display 130 of FIG. 3) including a first display region (e.g., the first display region 131*a* of FIG. 3) connected to the first housing and a second display region (e.g., the second display region 131*b* of FIG. 3) connected to the second housing, and a hinge module (e.g., the hinge module 200 of FIG. 4) connected to the first housing and the second housing. The hinge module may include a rotation bracket (e.g., the rotation bracket 350 of FIG. 5) including a first accommodation space (e.g., the first accommodation space 351 of FIG. 5) providing a first rotation axis (e.g., the first rotation axis Ax1 of FIG. 4) and a second accommodation space (e.g., the second accommodation space 352 of FIG. 5) providing a second rotation axis (e.g., the second rotation axis Ax2 of FIG. 4), a rotation member (e.g., the rotation members 310 and 320 of FIG. 5) including a first rotation member (e.g., the first rotation member 310 of FIG. 5) connected to the first display region and a second rotation member (e.g., the second rotation member 320 of FIG. 5) connected to the second display region, and a rail member (e.g., the rail members 330 and 340 of FIG. 6) including a first rail member (e.g., the first rail member 330 of FIG. 6) connected to the first rotation member and configured to rotate around the first rotation axis in the first accommodation space, and a second rail member (e.g., the second rail member 340 of FIG. 6) connected to the second rotation member and configured to rotate around the second rotation axis in the second accommodation space. A permeability of the rotation member may be 1 to 1.1 H/m.

According to various embodiments of the disclosure, a hinge module (e.g., the hinge module 200 of FIG. 4) may include a rotation bracket (e.g., the rotation bracket 350 of FIG. 5) including a first accommodation space (e.g., the first accommodation space 351 of FIG. 4) providing a first rotation axis (e.g., the first rotation axis Ax1 of FIG. 4) and a second accommodation space (e.g., the second accommodation space 352 of FIG. 4) providing a second rotation axis (e.g., the second rotation axis Ax2 of FIG. 4), a first rail member (e.g., the first rail member 330 of FIG. 6) configured to rotate around the first rotation axis in the first accommodation space, a second rail member (e.g., the second rail member 340 of FIG. 6) configured to rotate around the second rotation axis in the second accommodation space, a first rotation member (e.g., the first rotation member 310 of FIG. 6) connected to the first rail member, and a second rotation member (e.g., the second rotation member 320 of FIG. 6) connected to the second rail member. A first permeability of the first rotation member and/or the second rotation member may be lower than a second permeability of the first rail member and/or the second rail member.

The electronic device including a hinge module according to the disclosure described above is not limited to the foregoing embodiments and drawings, and it will be apparent to those skilled in the art that many substitutions, modifications, and changes can be made within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a housing comprising a first housing and a second housing;
   a display comprising a first display region connected to the first housing and a second display region connected to the second housing; and
   a hinge module connected to the first housing and the second housing,
   wherein the hinge module comprises:
      a rotation bracket comprising a first accommodation space providing a first rotation axis and a second accommodation space providing a second rotation axis,
      a rotation member comprising a first rotation member connected to the first display region and a second rotation member connected to the second display region, and
      a rail member comprising a first rail member connected to the first rotation member and configured to rotate in the first accommodation space, and a second rail member connected to the second rotation member and configured to rotate in the second accommodation space, and
   wherein a first permeability of the rotation member is lower than a second permeability of the rail member.

2. The electronic device of claim 1, wherein the first permeability of the rotation member is 1 to 1.1 henries per meter (H/m).

3. The electronic device of claim 1,
wherein the rotation member further comprises a front surface facing at least a part of the display and a rear surface opposite to the front surface, and
wherein the rail member is disposed on the rear surface.

4. The electronic device of claim 3,
wherein the rotation member further comprises a protrusion region protruding from the rear surface, and
wherein the rail member further comprises a fastening region surrounding at least a part of the protrusion region.

5. The electronic device of claim 1, wherein the hinge module further comprises a fastening member comprising a first fastening member to fix the first rail member to the first rotation member, and a second fastening member to fix the second rail member to the second rotation member.

6. The electronic device of claim 1,
wherein the rotation member further comprises austenite-based stainless steel, and
wherein the rail member further comprises at least one of ferrite-based stainless steel or martensite-based stainless steel.

7. The electronic device of claim 1, wherein the rail member further comprises a support surface facing the rotation member, and a curved structure formed to extend from the support surface and spaced apart from the first rotation axis or the second rotation axis by a specified distance.

8. The electronic device of claim 1, wherein the hinge module further comprises a first arm member connected to the first rotation member and comprising a first cam structure, and a second arm member connected to the second rotation member and comprising a second cam structure.

9. The electronic device of claim 8, wherein the hinge module further comprises a first gear shaft connected to the first arm member, a second gear shaft connected to the second arm member, and a plurality of idle gears connected to the first gear shaft and the second gear shaft.

10. The electronic device of claim 8, wherein the hinge module further comprises:
at least one cam member facing the first cam structure and the second cam structure; and
an elastic member facing the cam member and configured to provide an elastic force to the first cam structure or the second cam structure.

11. The electronic device of claim 8,
wherein the hinge module further comprises a first pin member connected to the first arm member and a second pin member connected to the second arm member,
wherein the first rotation member further comprises a first pin hole for accommodating the first pin member, and
wherein the second rotation member further comprises a second pin hole for accommodating the second pin member.

12. The electronic device of claim 11,
wherein at least a part of the first pin member is configured to slide within the first pin hole, and
wherein at least a part of the second pin member is configured to slide within the second pin hole.

13. The electronic device of claim 1,
wherein the display further comprises a touch circuit configured to detect a touch input or a hovering input to the display, and
wherein the rotation member faces at least a part of the touch circuit.

14. The electronic device of claim 1, wherein a yield strength of the rail member is greater than a yield strength of the rotation member.

15. The electronic device of claim 1,
wherein the first rotation member is disposed between the first display region and the first rail member, and
wherein the second rotation member is disposed between the second display region and the second rail member.

16. An electronic device comprising:
a housing comprising a first housing and a second housing;
a display comprising a first display region connected to the first housing and a second display region connected to the second housing; and
a hinge module connected to the first housing and the second housing,
wherein the hinge module comprises:
a rotation bracket comprising a first accommodation space providing a first rotation axis and a second accommodation space providing a second rotation axis,
a rotation member comprising a first rotation member connected to the first display region and a second rotation member connected to the second display region, and
a rail member comprising a first rail member connected to the first rotation member and configured to rotate around the first rotation axis in the first accommodation space, and a second rail member connected to the second rotation member and configured to rotate around the second rotation axis in the second accommodation space, and
wherein a permeability of the rotation member is 1 to 1.1 henries per meter (H/m).

17. The electronic device of claim 16,
wherein the rotation member further comprises a front surface facing at least a part of the display and a rear surface opposite to the front surface, and
wherein the rail member is disposed on the rear surface.

18. The electronic device of claim 16,
wherein the rotation member further comprises austenite-based stainless steel, and
wherein the rail member further comprises at least one of ferrite-based stainless steel or martensite-based stainless steel.

19. The electronic device of claim 16, wherein the rail member further comprises a fastening member comprising a first fastening member for fixing the first rail member to the first rotation member, and a second fastening member for fixing the second rail member to the second rotation member.

20. A hinge module comprising:
a rotation bracket comprising a first accommodation space providing a first rotation axis and a second accommodation space providing a second rotation axis;
a first rail member configured to rotate around the first rotation axis in the first accommodation space;
a second rail member configured to rotate around the second rotation axis in the second accommodation space;
a first rotation member connected to the first rail member; and
a second rotation member connected to the second rail member, wherein a first permeability of the first rotation member or the second rotation member is lower than a second permeability of the first rail member or the second rail member.

* * * * *